United States Patent
Ando

(10) Patent No.: US 11,563,903 B2
(45) Date of Patent: Jan. 24, 2023

(54) OPTICAL SENSOR, LEARNING APPARATUS, AND IMAGE PROCESSING SYSTEM FOR SELECTION AND SETTING LIGHT-RECEVING ELEMENTS

(71) Applicant: OMRON Corporation, Kyoto (JP)

(72) Inventor: Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 435 days.

(21) Appl. No.: 16/479,340

(22) PCT Filed: Jan. 18, 2018

(86) PCT No.: PCT/JP2018/001306
§ 371 (c)(1),
(2) Date: Jul. 19, 2019

(87) PCT Pub. No.: WO2018/155019
PCT Pub. Date: Aug. 30, 2018

(65) Prior Publication Data
US 2019/0387186 A1 Dec. 19, 2019

(30) Foreign Application Priority Data

Feb. 22, 2017 (JP) .............................. JP2017-031088

(51) Int. Cl.
*H04N 5/341* (2011.01)
*H04N 5/232* (2006.01)
(Continued)

(52) U.S. Cl.
CPC ............. *H04N 5/341* (2013.01); *G06V 10/22* (2022.01); *H04N 5/23212* (2013.01); *H04N 5/2254* (2013.01)

(58) Field of Classification Search
CPC .. H04N 5/341; H04N 5/23212; H04N 5/2254; G06K 9/2054
See application file for complete search history.

(56) References Cited

U.S. PATENT DOCUMENTS

| | | | |
|---|---|---|---|
| 4,773,749 A | 9/1988 | Ohtomo et al. | |
| 2004/0100573 A1* | 5/2004 | Nonaka | H04N 5/232123 348/E5.045 |

(Continued)

FOREIGN PATENT DOCUMENTS

| | | |
|---|---|---|
| CN | 103997599 A | 8/2014 |
| CN | 104583831 A | 4/2015 |

(Continued)

OTHER PUBLICATIONS

Nima Khademi Kalantari et al., "Learning-Based View Synthesis for Light Field Cameras", arxiv.org, Cornell University Library, Sep. 10, 2016, 201 Olin Library Cornell University, Ithaca, NY 14853; relevance is indicated in the ISR/WO dated Apr. 17, 2018.

(Continued)

*Primary Examiner* — Gevell V Selby
(74) *Attorney, Agent, or Firm* — Metrolex IP Law Group, PLLC

(57) ABSTRACT

An optical sensor according to one or more embodiments is an optical sensor including an optical member including a plurality of focusing units, each focusing unit focusing light from a subject, and a plurality of image capturing devices, each image capturing device including a plurality of light-receiving elements, each image capturing device being provided corresponding to one of the focusing units, and each image capturing device configured to receive light focused by the corresponding focusing unit and form a captured image of the subject. The light-receiving elements, of the plurality of light-receiving elements, that are to be used to form the captured image are set for each of the image capturing devices.

17 Claims, 17 Drawing Sheets

(51) Int. Cl.
*G06V 10/22* (2022.01)
*H04N 5/225* (2006.01)

(56) References Cited

U.S. PATENT DOCUMENTS

| | | |
|---|---|---|
| 2007/0206939 A1 | 9/2007 | Ito et al. |
| 2010/0188522 A1 | 7/2010 | Ohnishi et al. |
| 2011/0149125 A1* | 6/2011 | Morimoto ............ H04N 5/3456 348/272 |
| 2014/0226041 A1* | 8/2014 | Eguchi ................ H04N 5/2258 348/239 |
| 2015/0234148 A1 | 8/2015 | Kusaka |
| 2016/0277669 A1 | 9/2016 | Kusaka |
| 2018/0167565 A1* | 6/2018 | Abe .................... H04N 5/23229 |
| 2018/0220060 A1 | 8/2018 | Kusaka |
| 2019/0028653 A1* | 1/2019 | Minami ........... H04N 5/232122 |
| 2019/0219793 A1 | 7/2019 | Kusaka |

FOREIGN PATENT DOCUMENTS

| | | |
|---|---|---|
| CN | 106326932 A | 1/2017 |
| EP | 2889664 A1 | 7/2015 |
| JP | 2006-283383 A | 10/2006 |
| JP | 2006-287383 A | 10/2006 |
| JP | 2007-233247 A | 9/2007 |
| JP | 2011-077764 A | 4/2011 |
| JP | 2011-97645 A | 5/2011 |
| JP | 2011-135170 A | 7/2011 |
| JP | 2013-186314 A | 9/2013 |
| JP | 2016-184956 A | 10/2016 |
| WO | 2011/081187 A1 | 7/2011 |

OTHER PUBLICATIONS

Yoon Youngjin et al., "Learning a Deep Convolutional Network for Light-Field Image Super-Resolution", 2015 IEEE International Conference on Computer Vision Workshop (ICCVW), Dec. 7, 2015, pp. 57-65, IEEE; relevance is indicated in the ISR/WO dated Apr. 17, 2018.
Ren Ng et al., "Light Field Photography with a Hand-held Plenoptic Camera", Retrieved from the Internet: URL:https://graphics.stanford.edu/papers/lfcamera/lfcamera-150dpi.pdf(retrieved on Sep. 12, 2017), Feb. 1, 2005; relevance is indicated in the ISR/WO dated Apr. 17, 2018.
The International Search Report("ISR") of PCT/JP2018/001306 dated Apr. 17, 2018.
The Written Opinion("WO") of PCT/JP2018/001306 dated Apr. 17, 2018.
The Japanese Office Action (JPOA) dated Mar. 10, 2020 in a counterpart Japanese patent application.
Chinese Office Action (CNOA) dated Sep. 29, 2022 in a counterpart Chinese patent application and an English translation thereof.

\* cited by examiner

OPTICAL SENSOR, LEARNING APPARATUS, AND IMAGE PROCESSING SYSTEM FOR SELECTION AND SETTING LIGHT-RECEIVING ELEMENTS

TECHNICAL FIELD

The present invention relates to an optical sensor, a learning apparatus, and an image processing system.

BACKGROUND ART

JP 2011-077764A proposes an image processing apparatus in which an optical sensor using a microlens array and a plurality of photoelectric conversion elements obtains an image and a characteristic region in which a characteristic subject appears is extracted from the obtained image through machine learning that takes the image as input data. This image processing apparatus includes a model database holding image information of a plurality of types of models, which are more accurate than a multidimensional image, for a predetermined characteristic subject. As such, the image processing apparatus can obtain a highly-accurate multidimensional image by extracting the image information of a model corresponding to the characteristic region from the model database and generating composite image information for the characteristic region.

JP 2016-184956A proposes an image processing apparatus in which an optical sensor using a microlens array and a plurality of photoelectric conversion elements obtains an image, and the obtained image is divided into a first division region for obtaining distance information and a second division region for generating a refocus image on the basis of the distance information. According to this image processing apparatus, an image in which a wide range is in focus can be displayed during live-view driving while at the same time reducing the burden of processing for restructuring.

CITATION LIST

Patent Literature

[PTL 1] JP 2011-077764A
[PTL 2] JP 2016-184956A

SUMMARY OF INVENTION

Technical Problem

When an optical sensor using a microlens array and a plurality of photoelectric conversion elements is employed as in JP 2011-077764A and JP 2016-184956A, small physical changes in image capturing circumstances, such as the position, orientation, and attitude of the subject, can produce large changes in the captured images obtained by each of image capturing devices. Thus small physical changes arising in the image capturing circumstances can be easily identified from the captured images obtained by using the microlens array.

However, the inventor of the present invention discovered that the following problems can arise with such past methods of identifying attributes of a subject using an optical member having a plurality of focusing units such as a microlens array (note that "attributes" refers to qualities that can characterize a subject, such as the subject's position, attitude, shape, size, color, and type). In past methods, regardless of what image processing is carried out, all light-receiving elements in all image capturing devices receive light, and all pixels in each captured image obtained as a result are used in the process for identifying the attributes of the subject. Thus as the number of pixels in each image capturing device increases, the amount of computation in the process for identifying the subject attributes increases as well, which makes it difficult to use the results of identifying the subject attributes in real time.

Additionally, the captured images obtained through the corresponding microlenses are only different in terms of the positions of the microlenses, and are thus almost identical. Thus depending on the subject attributes to be identified, at least some of the pixels in each captured image may not be needed in the process for identifying the attributes. In other words, the process of identifying the subject attributes may have been carried out using captured images containing a large amount of unused and thus needless information.

For these reasons, the inventor of the present invention discovered that it is difficult to carry out an identification process suited to the subject attributes with the past methods.

Having been achieved in light of such circumstances, an object of one aspect of the present invention is to provide a technique that makes it possible to carry out an identification process suited to subject attributes.

Solution to Problem

The present invention employs the following configuration to solve the above-described problems.

An optical sensor according to one aspect of the present invention is an optical sensor including an optical member having a plurality of focusing units, each focusing unit focusing light from a subject, and a plurality of image capturing devices, each image capturing device having a plurality of light-receiving elements, each image capturing device being provided corresponding to one of the focusing units, and each image capturing device configured to receive light focused by the corresponding focusing unit and form a captured image of the subject. The light-receiving elements, of the plurality of light-receiving elements, that are to be used to form the captured image are set for each of the image capturing devices.

The optical sensor according to the configuration described above includes the plurality of image capturing devices, and each image capturing device receives light passing through the focusing units of the optical member using a plurality of light-receiving elements and forms a captured image (image data) of the subject. At this time, according to the configuration described above, the light-receiving elements, of the plurality of light-receiving elements, that are to be used to form the captured image are set for each of the image capturing devices. In other words, the plurality of light-receiving elements included in each image capturing device can be separated into light-receiving elements that receive light and form images and light-receiving elements that do not form images. As such, setting the light-receiving elements that can form an image not needed to identify the attributes of the subject as light-receiving elements that do not form images makes it possible to omit unused and thus needless information (pixels) from the captured images that are formed. "Needless information (pixels)" refers, for example, to pixels that have no influence on the identification of the attributes of the subject, pixels that have a comparatively low contribution to the identification of the attributes of the subject, and so on. Accordingly, using the captured images obtained by the optical sensor according to the configuration described above makes it possible to carry out an identification process suited to the attributes of the subject.

In the configuration described above, some or all of the plurality of light-receiving elements are set to not form images, and thus the captured images obtained by the image capturing devices may not be recognizable by humans. However, as will be described later, the captured images are used as inputs for a learning device that carries out machine learning for identifying predetermined attributes, and thus it is not necessary for the captured images to be recognizable by humans.

Additionally, according to the configuration described above, the light-receiving elements to be used are set appropriately while at the same time reducing the amount of information in the captured images, and thus diverse captured images can be obtained for a given subject. Thus by carrying out learning such as classification, clustering, feature amount extraction, and so on using the captured images that have been obtained, a learning device that can improve the accuracy of recognizing objects belonging to the same category as the subject, or in other words, that has excellent robustness, can be constructed.

The optical sensor according to the above-described aspect may further include a control unit configured to control the forming of the captured images by the image capturing devices in accordance with settings data indicating settings for the light-receiving elements to be used to form the captured images. According to this configuration, the settings for the light-receiving elements that form images and the light-receiving elements that do not form images can be controlled through software.

In the optical sensor according to the above-described aspect, the settings data may be created in a learning apparatus that trains a learning device to output attribute information of the subject upon the captured images being inputted, by selecting the light-receiving elements to be used in each image capturing device to be suited to identifying attributes of the subject; and the control unit may receive the created settings data from the learning apparatus and control the formation of the captured images by the image capturing devices in accordance with the received settings data. According to this configuration, the settings for the light-receiving elements that form images and the light-receiving elements that do not form images can be made suitable for identifying the attributes of the subject for which the learning device is trained. "Attribute information" refers to any information characterizing the subject, such as the position, orientation, attitude, size, shape, color, type, and peripheral conditions of the subject, and can include an image in which the subject itself is rendered.

In the optical sensor according to the above-described aspect, the setting of the light-receiving elements used to form the captured images may be carried out by a shielding member configured to block light from light-receiving elements not used to form the captured images without blocking light from the light-receiving elements used to form the captured images. According to this configuration, the settings for the light-receiving elements that form images and the light-receiving elements that do not form images can be controlled through hardware (the shielding member).

In the optical sensor according to the above-described aspect, the setting of the light-receiving elements used to form the captured images may be carried out in accordance with attributes of the subject to be identified from the captured images. According to this configuration, the settings for the light-receiving elements that form images and the light-receiving elements that do not form images can be made suitable for identifying the attributes of the subject.

The optical sensor according to the above-described aspect may further include a focusing lens arranged closer to the subject than the optical member and configured to focus light from the subject. According to this configuration, an optical sensor that can vary a field of view can be provided.

In the optical sensor according to the above-described aspect, the optical member may include at least one of a lens array, a diffraction grating, a diffusion lens, and a hologram lens. According to this configuration, the above-described optical sensor can be realized easily. The lens array is a microlens array, for example. However, the size of each lens is not limited to the micro scale, and can be selected as appropriate in consideration of the embodiment.

The optical sensor according to the above-described aspect may further include one or more other image capturing devices in which settings for the light-receiving elements to be used are not made. In other words, rather than all of the image capturing devices included in the optical sensor being configured such that settings for the light-receiving elements used to form the captured images are made, only some of the image capturing devices included in the optical sensor may be configured such that the settings for the light-receiving elements to be used are made. According to this configuration, needless information not used can be omitted from the captured images that are formed, for some of the image capturing devices included in the optical sensor. The image capturing devices in which the settings for the light-receiving elements to be used are made may be called "first image capturing devices" in particular, and the image capturing devices in which settings for the light-receiving elements to be used are not made may be called "second image capturing devices" in particular.

A learning apparatus according to one aspect of the present invention includes: an image obtainment unit configured to obtain the captured images captured by the image capturing devices from the optical sensor according to any one of the aspects described above; and a learning processing unit configured to train a learning device to output attribute information of the subject upon the obtained captured images being inputted. According to this configuration, a learning apparatus that constructs a learning device with which an identification process suited to the attributes of the subject can be carried out can be provided.

An image processing system according to one aspect of the present invention includes: an optical sensor including an optical member having a plurality of focusing units, each focusing unit focusing light from a subject, and a plurality of image capturing devices, each image capturing device having a plurality of light-receiving elements, each image capturing device being provided corresponding to one of the focusing units, and each image capturing device configured to receive light focused by the corresponding focusing unit and form a captured image of the subject, and the light-receiving elements, of the plurality of light-receiving elements, that are to be used to form the captured image being set for each of the image capturing devices; and an information processing apparatus configured to obtain attribute information indicating attributes of the subject by inputting the captured images obtained by the image capturing devices into a trained learning device that has been trained to identify attributes of the subject. According to this configuration, an image processing system that can carry out an identification process suited to the attributes of the subject can be provided.

In the image processing system according to the above-described aspect, in accordance with settings data indicating settings for the light-receiving elements used to form the captured images, the information processing apparatus may select pixels to be inputted to the learning device from a plurality of pixels constituting the captured images obtained by the image capturing devices. According to this configuration, an image processing system that can control the settings for the light-receiving elements that form images and the light-receiving elements that do not form images through software can be provided.

In the image processing system according to the above-described aspect, the learning device may be constituted by a neural network, a support vector machine, a self-organizing map, or a learning device that learns through reinforcement learning. According to this configuration, an image processing system that can carry out an identification process suited to the attributes of the subject can be realized easily.

In the image processing system according to the above-described aspect, the information processing apparatus may output, as the attribute information, one or a combination of a position, orientation, attitude, size, shape, motion, type, individual identification information, color, brightness, and environment information of the subject. According to this configuration, an image processing system that analyzes at least one of the position, orientation, attitude, size, shape, motion, type, individual identification information, color, brightness, and environment information of the subject can be provided. The "individual identification information" is information for identifying same or different types of subjects (objects, items). The "environment information" is information indicating the conditions of the subject and the periphery thereof.

In the image processing system according to the above-described aspect, on the basis of output of the learning device, the information processing apparatus may create an image in which the subject is rendered, and output the created image as the attribute information. According to this configuration, an image processing system that outputs an image reflecting the attributes of the subject can be provided.

According to the present invention, a technique that makes it possible to carry out an identification process suited to the attributes of a subject can be provided.

DESCRIPTION OF EMBODIMENTS

An embodiment according to an aspect of the present invention (also called "the present embodiment" below) will be described next with reference to the drawings. However, the present embodiment described below is in all senses merely examples of the present invention. It goes without saying that many improvements and changes can be made without departing from the scope of the present invention. In other words, specific configurations based on the embodiment can be employed as appropriate in carrying out the present invention. Note that although the data mentioned in the embodiment is described with natural language, the data is more specifically defined by quasi-language, commands, parameters, machine language, and so on that can be recognized by computers.

§ 1 Application Example

Figure 1:
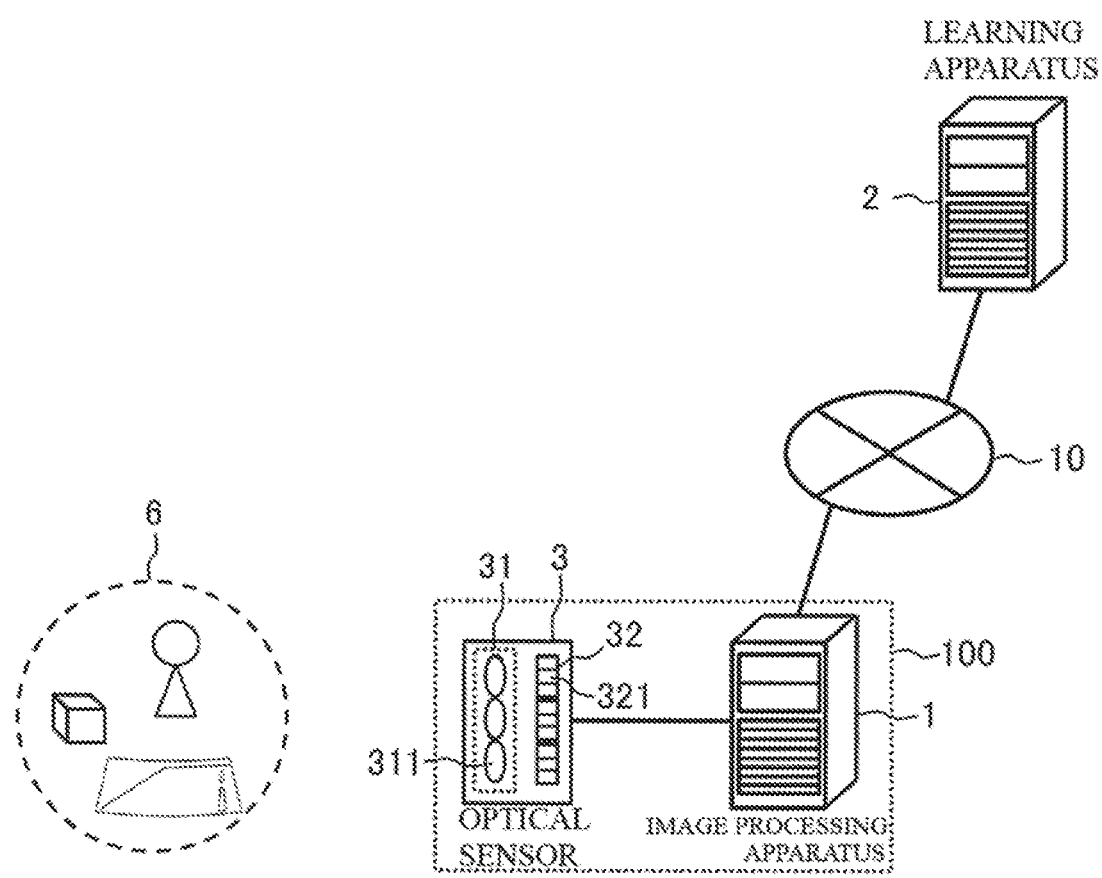
FIG. 1 schematically illustrates an example of a situation in which an image processing system and a learning apparatus according to an embodiment are applied.

First, an example of a situation in which the present invention is applied will be described using FIG. 1. FIG. 1 schematically illustrates an example of a situation in which an image processing system 100 and a learning apparatus 2 according to the present embodiment are applied. The image processing system 100 according to the present embodiment is an information processing system that analyzes attributes of a subject 6 using a trained learning device (a neural network 7, described later) that has been trained to identify the attributes of the subject 6.

As illustrated in FIG. 1, the image processing system 100 includes an optical sensor 3 that captures an image of the subject 6, and an image processing apparatus 1 that specifies attributes of the subject 6 using a plurality of captured images obtained by the optical sensor 3. The optical sensor 3 includes a lens array 31 having a plurality of lenses 311, and a plurality of image capturing devices 32 that receive light focused by corresponding lenses 311 and form captured images of the subject 6.

The lens array 31 is an example of an "optical member" according to the present invention. The lens array 31 is a microlens array, for example. However, the size of each lens 311 is not limited to the micro scale, and can be selected as appropriate in consideration of the embodiment. Each lens 311 is an example of a "focusing unit" according to the present invention. The subject 6 includes anything that can be captured by the optical sensor 3, for example scenes including a state of a vehicle's surroundings, products manufactured on a production line, predetermined objects such as people, and so on.

Each image capturing device 32 is constituted by a plurality of light-receiving elements 321. The light-receiving elements, of the plurality of light-receiving elements 321, that are to be used to form the captured image are set for each of the image capturing devices 32. In other words, settings for whether or not each light-receiving element 321 will form an image are prepared, and on the basis of these settings, the plurality of light-receiving elements 321 in each image capturing device 32 are divided into light-receiving elements that receive light and form an image and light-receiving elements that do not form an image. In the following, the light-receiving elements that receive light and form an image will also be referred to as "active light-receiving elements", and the light-receiving elements that do not form images will also be referred to as "inactive light-receiving elements".

This makes it possible to obtain a captured image that omits pixels of an amount corresponding to the inactive light-receiving elements 321. The image processing apparatus 1 obtains attribute information expressing attributes of the subject 6 by taking each captured image formed by the active light-receiving elements 321 of the image capturing devices 32 and inputting those images into a trained learning device that has been trained to identify the attributes of the subject 6.

The learning apparatus 2 according to the present embodiment is a computer that constructs a learning device used by the image processing system 100, or in other words, carries out machine learning of the learning device so that the attributes of the subject 6 are outputted in response to the input of a plurality of the captured images obtained by the optical sensor 3. Specifically, the learning apparatus 2 obtains each of the captured images captured by the image capturing devices 32 from the above-described optical sensor 3. The learning apparatus 2 trains the learning device (a neural network 8, described later) to output the attributes of the subject 6 upon the obtained captured images being inputted.

A trained learning device used in the above-described image processing system 100 can thus be created. The image processing apparatus 1 can obtain the trained learning device created by the learning apparatus 2 over a network 10, for example. The type of the network 10 may be selected as appropriate from among the internet, a wireless communication network, a mobile communication network, a telephone network, a dedicated network, or the like, for example.

As described above, the image capturing devices 32 of the optical sensor 3 according to the present embodiment can obtain a captured image that omits pixels of an amount corresponding to the inactive light-receiving elements 321. As such, setting the light-receiving elements 321 that can form an image not needed to identify the attributes of the subject 6 as inactive light-receiving elements makes it possible to omit unused and thus needless information (pixels) from the captured images that are formed. Thus according to the image processing system 100 of the present embodiment, an identification process suited to the attributes of the subject 6 can be carried out.

Furthermore, according to the method of the present embodiment, setting the active light-receiving elements 321 appropriately makes it possible to obtain diverse captured images of the subject 6 even while reducing the amount of information in each captured image. Thus by carrying out learning such as classification, clustering, feature amount extraction, and so on using the captured images that have been obtained, machine learning that can improve the accuracy of recognizing objects belonging to the same category as the subject 6, or in other words, that has excellent robustness, can be realized.

§ 2 Configuration Example (Hardware Configuration)
<Image Processing Apparatus>

Figure 2:
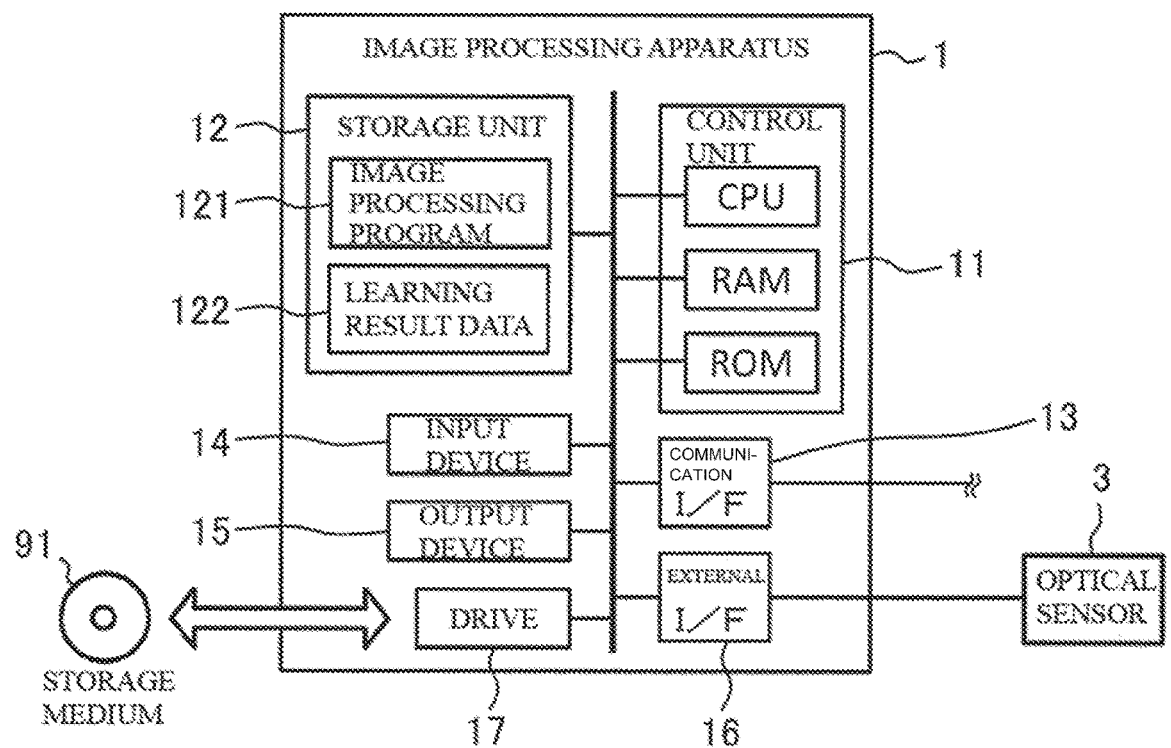
FIG. 2 schematically illustrates an example of the hardware configuration of the image processing apparatus according to the embodiment.

An example of the hardware configuration of the image processing apparatus 1 according to the present embodiment will be described next using FIG. 2. FIG. 2 schematically illustrates an example of the hardware configuration of the image processing apparatus 1 according to the present embodiment.

As illustrated in FIG. 2, the image processing apparatus 1 according to the present embodiment is a computer in which a control unit 11, a storage unit 12, a communication interface 13, an input device 14, an output device 15, an external interface 16, and a drive 17 are electrically connected to each other. The image processing apparatus 1 according to the present embodiment corresponds to an "information processing apparatus" according to the present invention. Note that the communication interface and the external interface are denoted as "communication I/F" and "external I/F", respectively, in FIG. 2.

The control unit 11 includes a central processing unit (CPU), random access memory (RAM), ROM (read-only memory), and so on, and is configured to control the various constituent elements in accordance with information processing. The storage unit 12 is an auxiliary storage device such as a hard disk drive or a solid-state drive, and stores an image processing program 121 executed by the control unit 11, learning result data 122 indicating information pertaining to the trained learning device, and so on.

Figure 8:
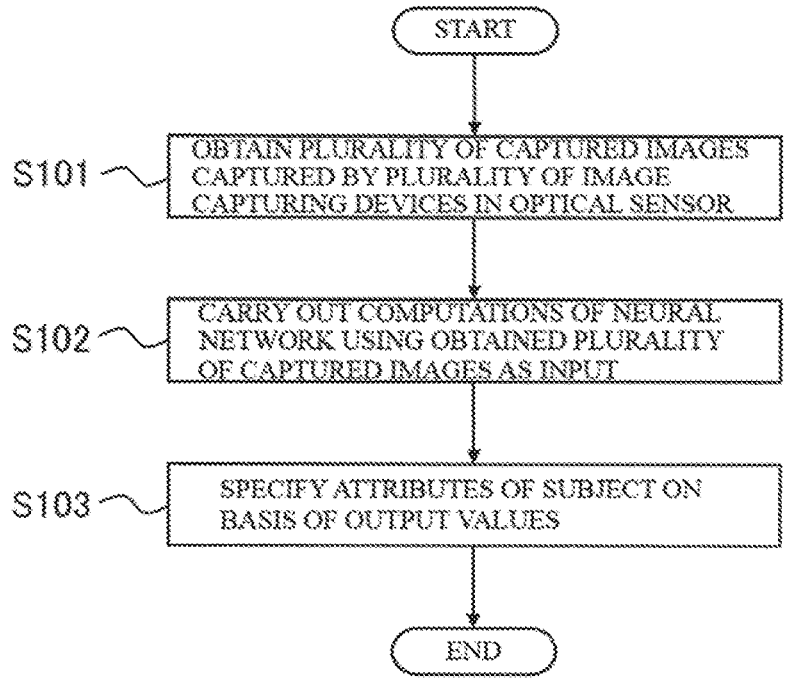
FIG. 8 illustrates an example of a processing sequence carried out by the image processing apparatus according to the embodiment.

The image processing program 121 is a program for causing the image processing apparatus 1 to execute a process of analyzing the attributes of the subject 6, which will be described later (FIG. 8). The learning result data 122 is data for configuring the trained learning device. Details will be given later.

The communication interface 13 is a wired local area network (LAN) module, a wireless LAN module, or the like, and is an interface for carrying out wired or wireless communication over a network. The input device 14 is a device for making inputs, such as a mouse or a keyboard. The output device 15 is a device for output, such as a display or speakers. The external interface 16 is a Universal Serial Bus (USB) port or the like, and is an interface for connecting to an external device such as the optical sensor 3.

The drive 17 is a compact disk (CD) drive, a Digital Versatile Disk (DVD) drive, or the like, and is a device for loading programs stored in a storage medium 91. The type of the drive 17 may be selected as appropriate in accordance with the type of the storage medium 91. The image processing program 121 and/or the learning result data 122 may be stored in the storage medium 91.

The storage medium 91 is a medium that stores information of programs or the like, recorded by the computer or other devices or machines, through electrical, magnetic, optical, mechanical, or chemical effects so that the program information can read. The image processing apparatus 1 may obtain the image processing program 121 and/or the learning result data 122 from the storage medium 91.

FIG. 2 illustrates an example in which the storage medium 91 is a disk-type storage medium such as a CD or a DVD. However, the type of the storage medium 91 is not limited to a disk, and a type aside from a disk may be used instead. Semiconductor memory such as flash memory can be given as an example of a non-disk type storage medium.

With respect to the specific hardware configuration of the image processing apparatus 1, constituent elements can be omitted, replaced, or added as appropriate in accordance with the embodiment. For example, the control unit 11 may include a plurality of processors. The image processing apparatus 1 may be constituted by a plurality of information processing apparatuses. Furthermore, rather than an information processing apparatus designed specifically for a service to be provided, the image processing apparatus 1 may use a generic desktop personal computer (PC), tablet PC, or the like.

<Optical Sensor>

Figure 3A:
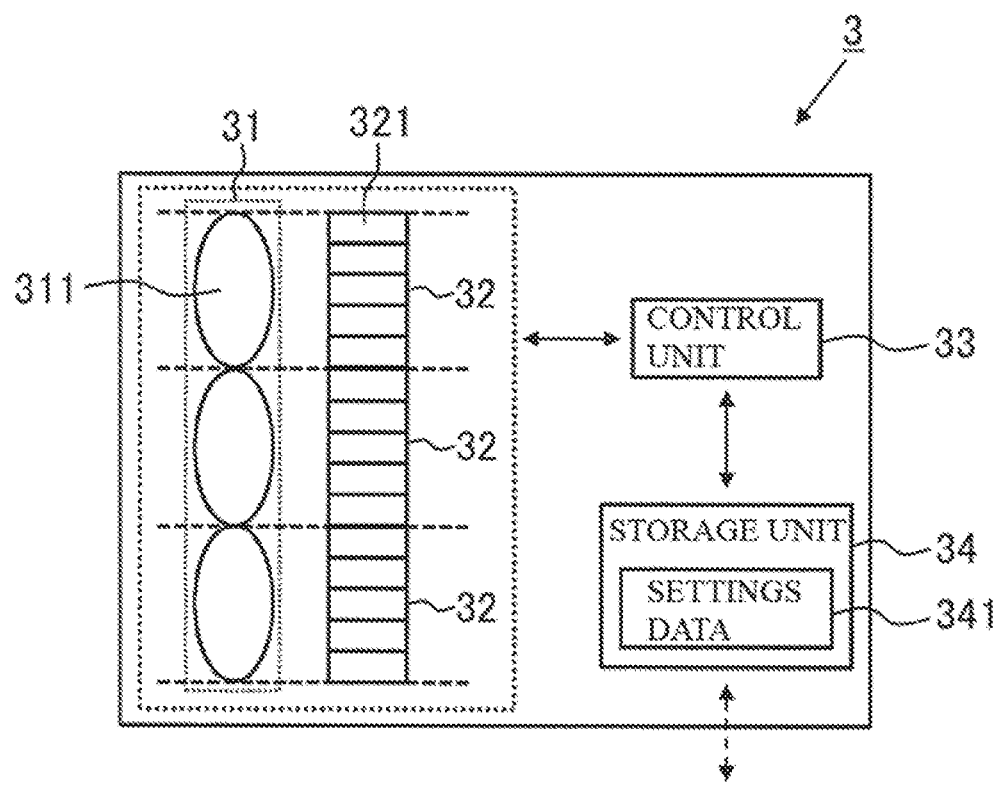
FIG. 3A schematically illustrates an example of the configuration of an optical sensor according to the embodiment.
Figure 3B:
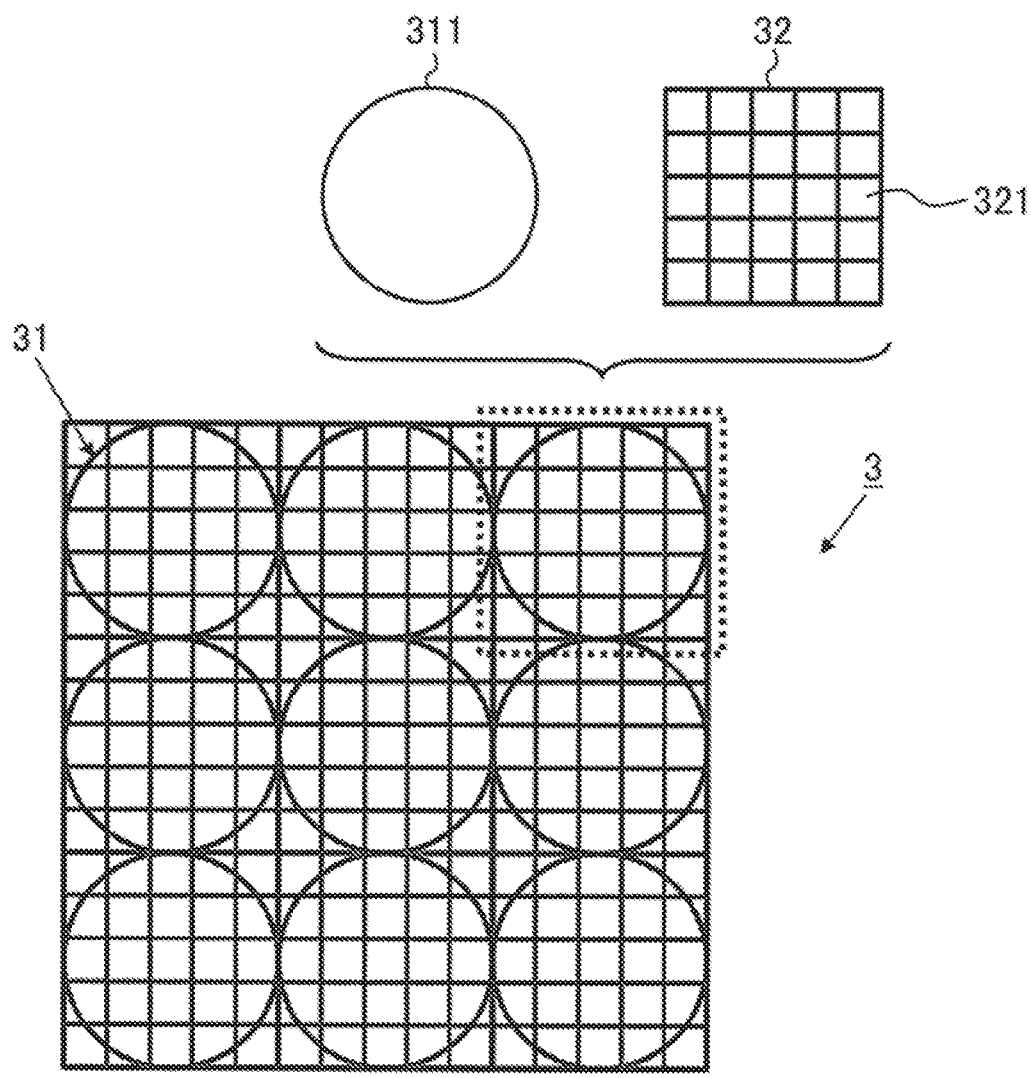
FIG. 3B schematically illustrates an example of a relationship between optical members and image capturing devices in the optical sensor according to the embodiment.

An example of the configuration of the optical sensor 3 according to the present embodiment will be described next using FIGS. 3A and 3B. FIG. 3A schematically illustrates an example of the configuration of the optical sensor 3 according to the present embodiment. FIG. 3B schematically illustrates an example of the relationships between the lens array 31 and the image capturing devices 32 in the optical sensor 3 according to the present embodiment.

As illustrated in FIGS. 3A and 3B, the optical sensor 3 according to the present embodiment includes: the lens array 31, having 3×3 of the lenses 311; 3×3 of the image capturing devices 32 arranged so as to correspond to the lenses 311; a control unit 33 that controls the formation of captured images by the image capturing devices 32; and a storage unit 34 that stores settings data 341.

(Lens Array)

The lens array 31 according to the present embodiment is a microlens array, for example. However, the dimensions of the lenses 311 in the lens array 31 need not be limited to the micro scale, and may be determined as appropriate in accordance with the embodiment. For example, the sizes of the lenses 311 can be determined in accordance with the image capturing devices 32 that are used.

Each of the lenses 311 is configured as appropriate to focus light from the subject 6 onto the corresponding image capturing device 32. The optical properties of each of the lenses 311, such as the focus angle, refractive index, and band of light allowed to pass, may be set as appropriate in accordance with the embodiment. All of the lenses 311 may have identical optical properties, or the optical properties may differ among the lenses 311. The desired optical properties of the lenses 311 can be realized by designing the lenses while adjusting at least one of the size, material, and shape of each lens as appropriate.

The lens array 31 can be manufactured as appropriate from known materials and through a known manufacturing method. For example, the lens array 31 can be manufactured by processing a light-transmissive material such as a resin material or a glass material through a manufacturing method such as injection molding, cutting, welding, or the like. Note that the lens array 31 may be configured so that the focus can be adjusted by appropriately varying the optical axis direction of incident light using a motor (not illustrated) or the like.

(Image Capturing Device)

As illustrated in FIG. 3B, each image capturing device 32 according to the present embodiment is an image sensor having 5×5 of the light-receiving elements 321. Each light-receiving element 321 is constituted by a complementary MOS (CMOS), a charge-coupled device (CCD), or the like. Accordingly, each image capturing device 32 is configured to receive light focused by the corresponding lens 311 in the lens array 31 are form a captured image of the subject 6. In the example of FIG. 3B, each image capturing device 32 is configured to form a captured image having 5×5 pixels.

The size of each image capturing device 32 can be set as appropriate on the basis of factors such as the side of the subject 6 to be captured, the size of a part of the subject 6 to be identified, and the distance to the subject 6. However, based on the size of the subject 6 and the distance to the subject 6, it is preferable that an image capturing device having a resolution of one to several hundreds of pixels in the vertical direction and one to several hundreds of pixels in the horizontal direction be used as the image capturing device 32. At this time, the aspect ratio of the image capturing device can be set on the basis of the aspect ratio of a range to be detected.

(Control Unit and Storage Unit)

The control unit 33 is constituted by a microprocessor including a CPU, for example, and the storage unit 34 is constituted by memory such as RAM or ROM. The settings data 341 stored in the storage unit 34 indicates settings of the light-receiving elements 321 used to form the captured image. To rephrase, the settings data 341 indicates which light-receiving elements 321 are active and which light-receiving elements 321 are inactive in each image capturing device 32.

In the present embodiment, the light-receiving elements, of the plurality of light-receiving elements 321, that are to be used to form the captured image are set for each of the image capturing devices 32 on the basis of the settings data 341. In other words, the control unit 33 controls the formation of the captured images by the image capturing devices 32 in accordance with the settings data 341. The settings data 341 may be unique to the optical sensor 3, or may be received from the image processing apparatus 1 or the learning apparatus 2.

(Examples of Settings)

Examples of the settings for the light-receiving elements used to form the captured images will be described next with reference to FIGS. 4A to 4I. FIGS. 4A to 4I schematically illustrate examples of the settings for the light-receiving elements used to form the captured images. Specifically, FIGS. 4A to 4I illustrate the light-receiving elements as seen from a rear surface side of the optical sensor 3 (the side opposite from the side on which the lens array 31 is located). In FIGS. 4A to 4I, of the 5×5 cells, the hatched cells indicate active light-receiving elements 321, and the unhatched white cells indicate inactive light-receiving elements 321.

Figure 4A:
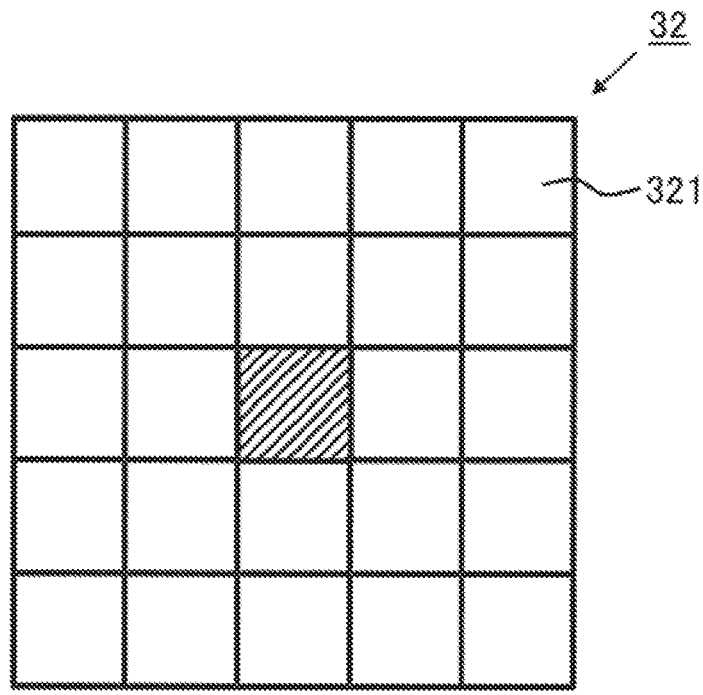
FIG. 4A schematically illustrates an example of settings for light-receiving elements that form an image, in the optical sensor according to the embodiment.

(1) In the example of FIG. 4A, of the 5×5 light-receiving elements 321, the one light-receiving element 321 in the center is set as an active light-receiving element, and the other 24 light-receiving elements 321 are set as inactive light-receiving elements. An image capturing device 32 in which these settings are applied can form a captured image (one pixel) in which one part of the subject 6 in front of the corresponding lens 311 is accurately captured.

Accordingly, when these settings are applied in one of the image capturing devices 32, whether or not the subject 6 is present in front of the lens 311 can be identified on the basis of the captured image (one pixel) obtained from that image capturing device 32. When these settings are applied in a plurality of the image capturing devices 32, the type and so on of the subject 6 present in front of the lenses 311 can be identified on the basis of the plurality of captured images obtained from the plurality of the image capturing devices 32 in which the settings are applied.

Figure 4B:
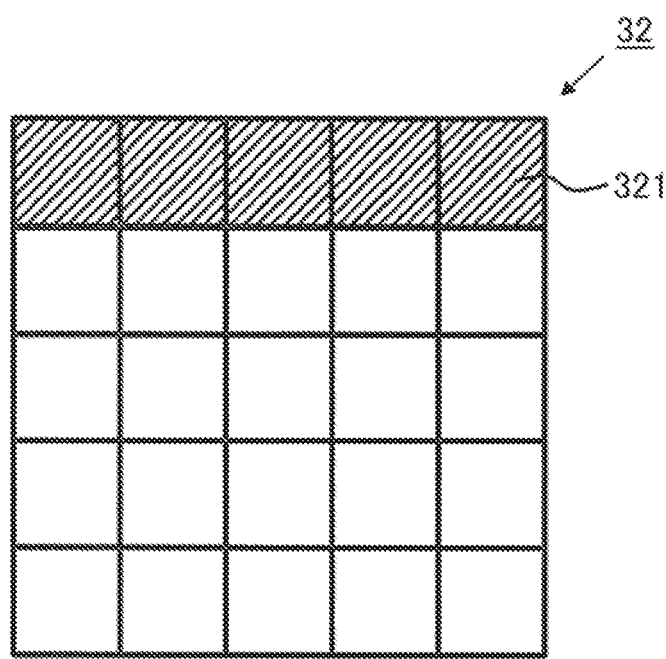
FIG. 4B schematically illustrates an example of settings for the light-receiving elements that form an image, in the optical sensor according to the embodiment.

(2) In the example of FIG. 4B, of the 5×5 light-receiving elements 321, the five light-receiving element 321 present in the uppermost horizontal row are set as active light-receiving elements, and the other 4×5 light-receiving elements 321 are set as inactive light-receiving elements. An image capturing device 32 in which these settings are applied can form a captured image (five pixels) in which a lower part of the subject 6 is captured across a broad horizontal range, as seen from the optical sensor 3.

Accordingly, whether or not the subject 6 entering a lower region of the image capturing range is present can be identified on the basis of the captured image obtained from the image capturing device 32 in which these settings are applied. For example, when a state to the front of a vehicle has been captured by the optical sensor 3, a captured image obtained from an image capturing device 32 in which the settings illustrated in FIG. 4B are applied can be used to determine whether or not an object obstructing travel has entered into a range of travel near the vehicle.

Figure 4C:
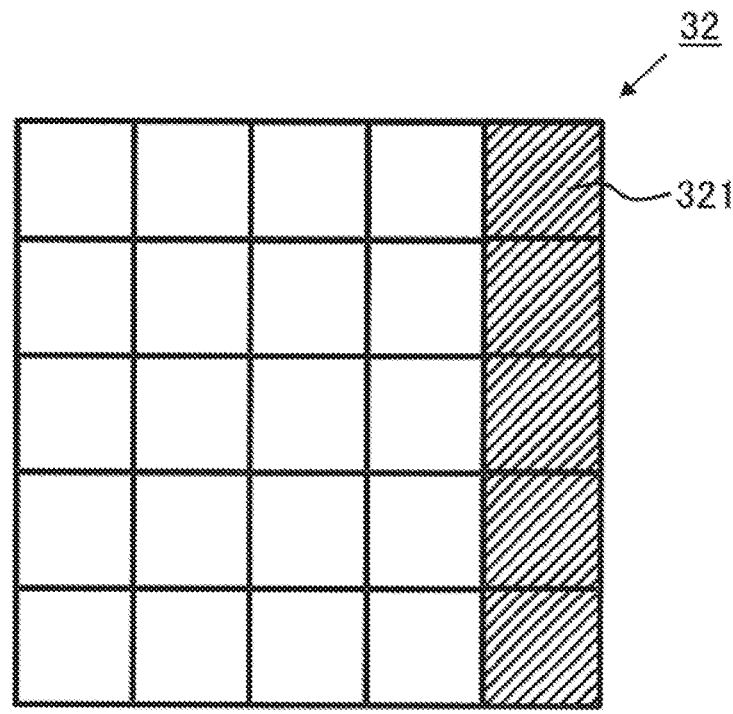
FIG. 4C schematically illustrates an example of settings for the light-receiving elements that form an image, in the optical sensor according to the embodiment.

(3) In the example of FIG. 4C, of the 5×5 light-receiving elements 321, the five light-receiving element 321 present in the rightmost vertical column are set as active light-receiving elements, and the other 5×4 light-receiving elements 321 are set as inactive light-receiving elements. An image capturing device 32 in which these settings are applied can form a captured image (five pixels) in which a left part of the subject 6 is captured across a broad vertical range, as seen from the optical sensor 3.

Accordingly, whether or not the subject 6 entering a left region of the image capturing range from the vertical direction is present can be identified on the basis of the captured image obtained from the image capturing device 32 in which these settings are applied. For example, when a state to the front of a vehicle has been captured by the optical sensor 3, a captured image obtained from an image capturing device 32 in which the settings illustrated in FIG. 4C are applied can be used to determine whether or not an object entering from a vertical direction, such as a sign or a falling object, is present in a left-side region of a range of travel of the vehicle.

Figure 4D:
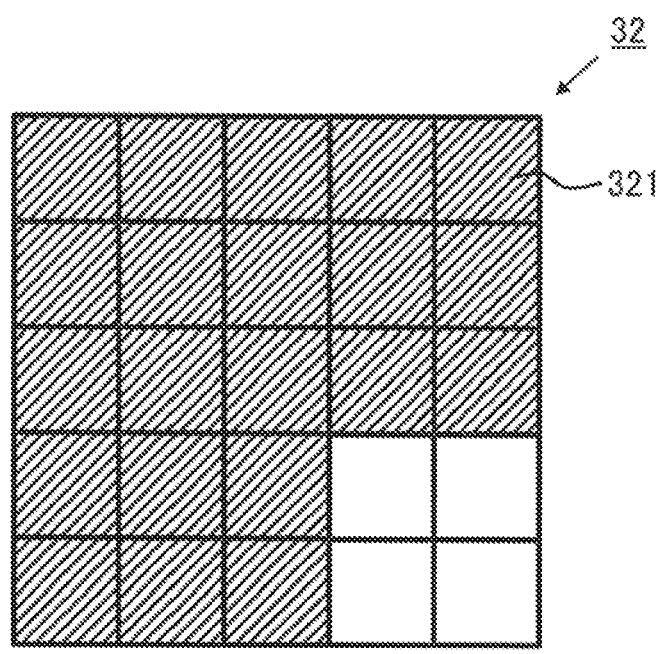
FIG. 4D schematically illustrates an example of settings for the light-receiving elements that form an image, in the optical sensor according to the embodiment.

(4) In the example of FIG. 4D, of the 5×5 light-receiving elements 321, the four light-receiving elements 321 in the bottom-right corner are set as inactive light-receiving elements, and the other 21 light-receiving elements 321 are set as active light-receiving elements. An image capturing device 32 in which these settings are applied can form a captured image (21 pixels) in which a region aside from an upper-left region of the image capturing range is captured, as seen from the optical sensor 3.

For example, when a light source emitting intense light such as sunlight is present in an upper-left region of the image capturing range, blowout will arise in the light-receiving elements 321 present in the bottom-right corner of each image capturing device 32, and thus images that can be used to identify the attributes of the subject 6 cannot be obtained. However, the settings illustrated in FIG. 4D make it possible to obtain a captured image (21 pixels) that omits a range in which blowout can arise due to a light source emitting intense light being present in an upper-left region of the image capturing range. In other words, by applying the settings illustrated in FIG. 4D, pixels that, due to the influence of sunlight or the like, result in needless information that cannot be used to identify the attributes of the subject 6 can be omitted from the captured images obtained by the image capturing devices 32.

Figure 4E:
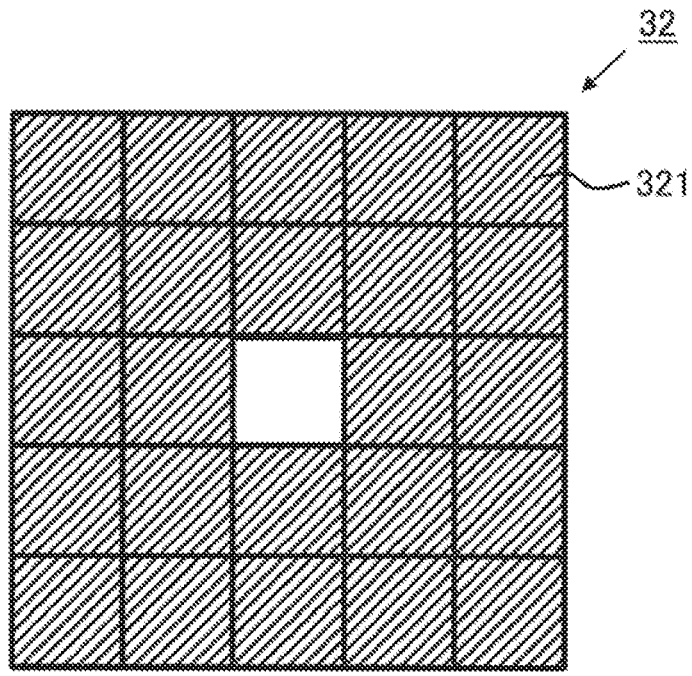
FIG. 4E schematically illustrates an example of settings for the light-receiving elements that form an image, in the optical sensor according to the embodiment.

(5) The settings of FIG. 4E are the opposite of the settings of FIG. 4A. In other words, in the example of FIG. 4E, of the 5×5 light-receiving elements 321, the one light-receiving element 321 in the center is set as an inactive light-receiving element, and the other 24 light-receiving elements 321 are set as active light-receiving elements. An image capturing device 32 in which these settings are applied can form a captured image (24 pixels) in which a region containing all but one part of the subject 6 in front of the corresponding lens 311 is captured.

For example, when a state to the front of a vehicle has been captured by the optical sensor 3, and a light source emitting intense light, such as the headlights of a vehicle traveling in front of the stated vehicle, is present in the center of the image capturing range of the image capturing device 32, blowout will arise in the light-receiving element 321 present in the center, in the same manner as the example illustrated in FIG. 4D. An image that can be used to identify the attributes of the subject 6 cannot be obtained as a result. However, the settings illustrated in FIG. 4E make it possible to obtain a captured image (24 pixels) that omits a range in which blowout can arise due to a light source emitting intense light being present in a central region of the image capturing range. In other words, by applying the settings illustrated in FIG. 4E, pixels that, due to headlights of a vehicle traveling in front or the like, result in needless information that cannot be used to identify the attributes of the subject 6 can be omitted from the captured images obtained by the image capturing devices 32.

The range of the light-receiving elements 321 affected by the headlights is determined by the positional relationship between the vehicle traveling in front and the host vehicle. Thus if the vehicle on which the optical sensor 3 is mounted includes a rangefinder that measures a distance to the vehicle traveling in front, the optical sensor 3 may be configured to specify the range of the light-receiving elements 321 affected by the headlights on the basis of a result of measuring the distance, and switch the light-receiving elements 321 included in the specified range to inactive light-receiving elements.

Figure 4F:
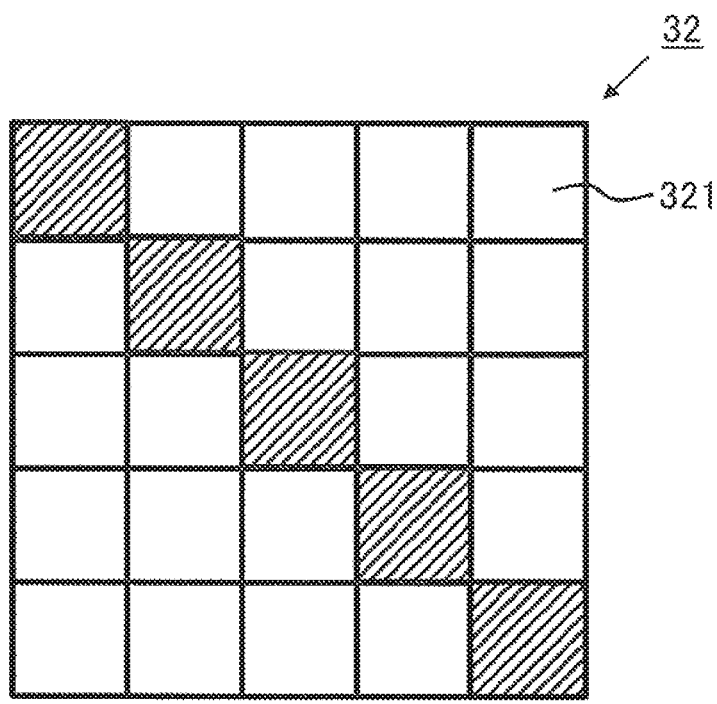
FIG. 4F schematically illustrates an example of settings for the light-receiving elements that form an image, in the optical sensor according to the embodiment.

(6) In the example of FIG. 4F, of the 5×5 light-receiving elements 321, the five light-receiving elements 321 present in a diagonal region from the upper-left corner to the lower right corner are set as active light-receiving elements, and the other 20 light-receiving elements 321 are set as inactive light-receiving elements. An image capturing device 32 in which these settings are applied can form a captured image (five pixels) in which the subject 6 is captured in a diagonal direction from an upper-left corner to a lower-right corner, as seen from the optical sensor 3.

For example, when the optical sensor 3 is mounted on a vehicle and road conditions in the travel range are captured, an edge of the road extending forward from the vehicle can appear in a diagonal direction in the captured images obtained by the image capturing devices 32. Likewise, when the optical sensor 3 is arranged in a production line and captures the conditions of a conveyor belt, an edge of the conveyor belt may appear in a diagonal direction in the captured images obtained by the image capturing devices 32. Thus a captured image obtained from an image capturing device 32 in which these settings are applied can be used to identify the edges of a road, a conveyor belt, or the like extending in a diagonal direction.

Figure 4G:
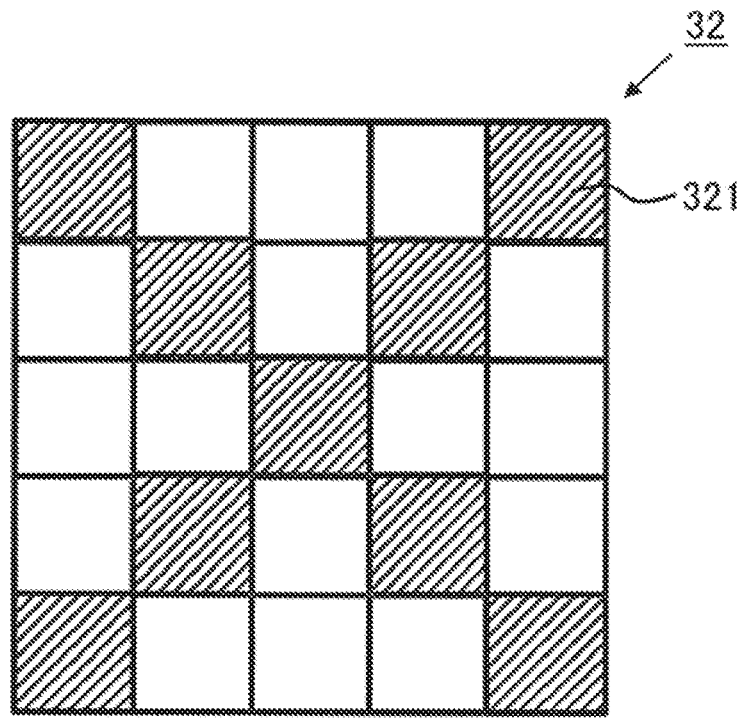
FIG. 4G schematically illustrates an example of settings for the light-receiving elements that form an image, in the optical sensor according to the embodiment.

(7) In the example of FIG. 4G, of the 5×5 light-receiving elements 321, the nine light-receiving elements 321 present in a region extending in a downward-right diagonal direction from the upper-left corner to the lower-right corner and a region extending in a downward-left diagonal direction from the upper-right corner to the lower-left corner are set as active light-receiving elements, and the other 16 light-receiving elements 321 are set as inactive light-receiving elements. An image capturing device 32 in which these settings are applied can form a captured image (nine pixels) in which an x shape of the subject 6 is captured. The settings of FIG. 4G resemble the settings of FIG. 4F. Thus a captured image obtained from an image capturing device 32 in which these settings are applied can be used to identify the edges of a road, a conveyor belt, or the like extending in a diagonal direction.

Figure 4H:
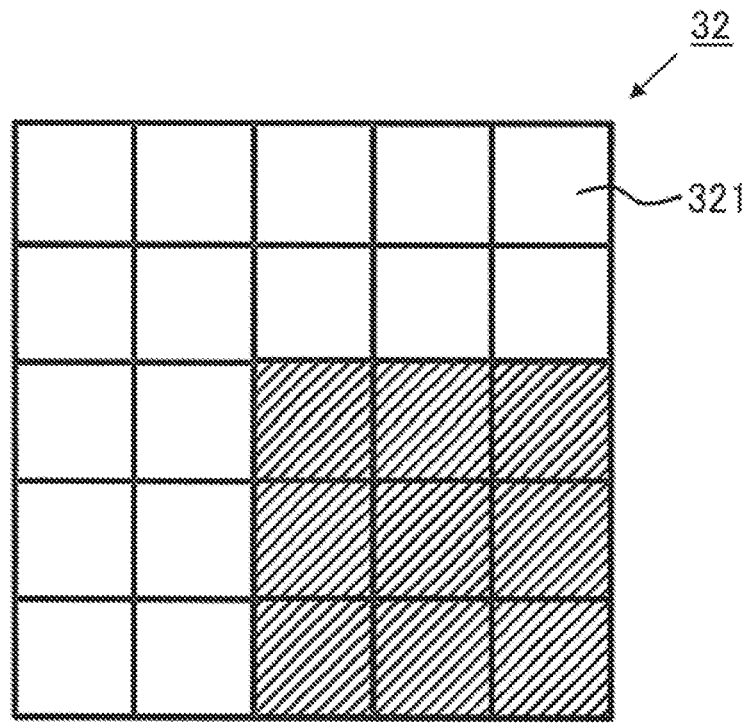
FIG. 4H schematically illustrates an example of settings for the light-receiving elements that form an image, in the optical sensor according to the embodiment.

(8) In the example of FIG. 4H, of the 5×5 light-receiving elements 321, the 3×3 light-receiving elements 321 in the bottom-right corner are set as active light-receiving elements, and the other 16 light-receiving elements 321 are set as inactive light-receiving elements. An image capturing device 32 in which these settings are applied can form a captured image (9 pixels) in which an upper-left region of the image capturing range is captured, as seen from the optical sensor 3. The example of FIG. 4H illustrates settings that are almost opposite from the settings of FIG. 4D. In other words, a captured image obtained from an image capturing device 32 in which the settings illustrated in FIG. 4D are applied can be used to identify the attributes of the subject 6 present in an upper-left region of the image capturing range.

Figure 4I:
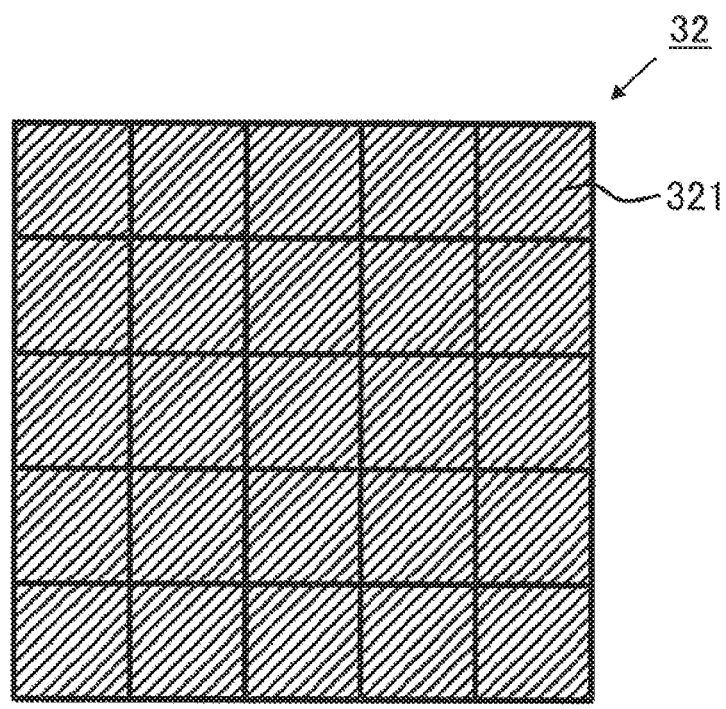
FIG. 4I schematically illustrates an example of settings for the light-receiving elements that form an image, in the optical sensor according to the embodiment.

(9) In the example of FIG. 4I, all of the light-receiving elements 321 are set as active light-receiving elements. When the entire image capturing range is to be analyzed, for example, all of the light-receiving elements 321 may be set to be active light-receiving elements in this manner. Applying the settings illustrated in FIG. 4I to all of the image capturing devices 32 will increase the amount of calculations required to analyze the attributes of the subject 6, but if the settings illustrated in FIG. 4I are applied to only some of the image capturing devices 32, the image capturing range can be fully analyzed while reducing the amount of calculations required to analyze the attributes of the subject 6.

(Summary)

As described thus far, in the present embodiment, the control unit 33 controls the settings of the active light-receiving elements and the inactive light-receiving elements through software on the basis of the settings data 341. At this time, the control unit 33 may make the settings of the light-receiving elements used to form the captured image correspond to the attributes of the subject 6 to be identified from the captured image. To identify the type of the subject 6 present in front of the lens array 31, for example, the control unit 33 may apply the settings illustrated in FIG. 4A to all of the image capturing devices 32. Additionally, for example, to identify an edge in the diagonal direction, the control unit 33 may apply the settings illustrated in FIG. 4F or FIG. 4G to at least some of the nine image capturing devices 32.

The same settings may be applied to all of the image capturing devices 32, or different settings may be applied to different image capturing devices 32. Also, the settings of the light-receiving elements used to form the captured images need not be limited to the above-described examples, and may be determined as appropriate in accordance with the embodiment. For example, in the example of FIG. 4A, a plurality of the light-receiving elements 321 in the center may be set as active light-receiving elements. Also, in the examples illustrated in FIGS. 4B, 4C, 4F, and 4G, for example, the rows in which active light-receiving elements are set may be varied, or there may be a plurality of such rows. Also, in the examples illustrated in FIGS. 4D and 4H, for example, the positions, shapes, and numbers of light-receiving elements 321 present in the regions in which active light-receiving elements are set and the regions in which inactive light-receiving elements are set may be varied. Also, in the examples illustrated in FIGS. 4F and 4G, for example, the angles of the diagonal directions may be set as appropriate. The settings for the light-receiving elements used to form the captured images are made as appropriate such that in each image capturing device 32, the light-receiving elements 321 present in parts suited to the analysis of the attributes of the subject 6 are active light-receiving elements, and the light-receiving elements 321 present in parts not needed in the analysis of the attributes of the subject 6 and in parts that do not significantly contribute to the analysis are inactive light-receiving elements.

Additionally, the data format of the captured image obtained on the basis of these settings may be selected as appropriate in accordance with the embodiment. For example, the control unit 33 may form a captured image reflecting the settings of the light-receiving elements used to form the captured image by taking signals from all of the light-receiving elements 321 and then adding flags to pixels corresponding to inactive light-receiving elements to indicate that those pixels will not be used as inputs to the learning device. Also, for example, the control unit 33 may form a captured image reflecting the settings of the light-receiving elements used to form the captured image by taking signals from the light-receiving elements 321 set as active light-receiving elements but not taking signals from the light-receiving elements 321 set as inactive light-receiving elements.

<Learning Apparatus>

Figure 5:
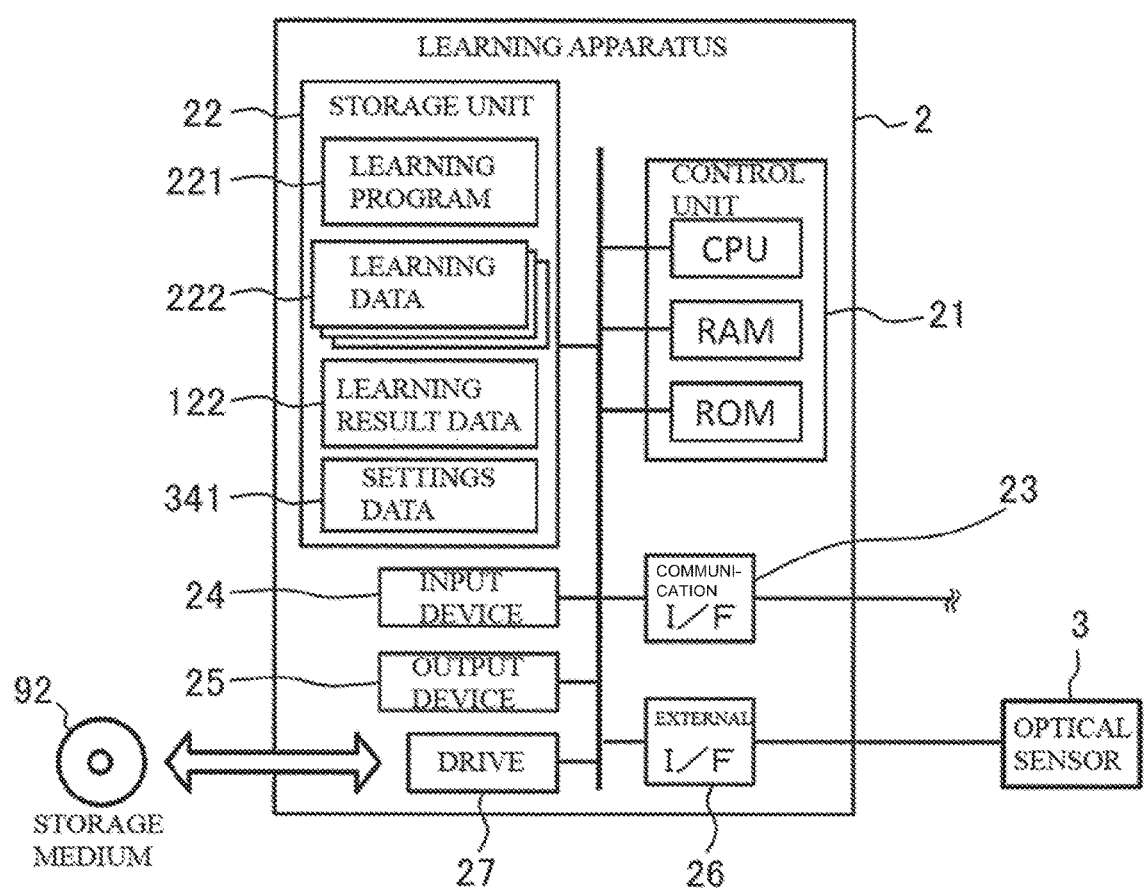
FIG. 5 schematically illustrates an example of the hardware configuration of the learning apparatus according to the embodiment.

An example of the hardware configuration of the learning apparatus 2 according to the present embodiment will be described next using FIG. 5. FIG. 5 schematically illustrates an example of the hardware configuration of the learning apparatus 2 according to the present embodiment.

As illustrated in FIG. 5, the learning apparatus 2 according to the present embodiment is a computer in which a control unit 21, a storage unit 22, a communication interface 23, an input device 24, an output device 25, an external interface 26, and a drive 27 are electrically connected to each other. As in FIG. 2, the communication interface and the external interface are denoted as "communication I/F" and "external I/F", respectively, in FIG. 5.

The control unit 21 to the drive 27, and a storage medium 92, are the same as the control unit 11 to the drive 17, and the storage medium 91, of the above-described image processing apparatus 1. However, the storage unit 22 of the learning apparatus 2 stores a learning program 221 executed by the control unit 21, learning data 222 used to train the learning device, the learning result data 122 created by executing the learning program 221, the settings data 341 indicating the settings for the light-receiving elements 321 used to form the captured images, and so on.

The learning program 221 is a program for causing the learning apparatus 2 to execute a learning process (FIG. 9) for a neural network, described later. The learning data 222 is data for training the learning device to be capable of analyzing desired attributes of the subject 6. Details will be given later.

Like the above-described image processing apparatus 1, the learning program 221 and/or the learning data 222 may be stored in the storage medium 92. As such, the learning apparatus 2 may obtain the learning program 221 and/or the learning data 222 to be used from the storage medium 92.

Also like the image processing apparatus 1, with respect to the specific hardware configuration of the learning apparatus 2, constituent elements can be omitted, replaced, or added as appropriate in accordance with the embodiment. Furthermore, rather than an information processing apparatus designed specifically for a service to be provided, the learning apparatus 2 may use a generic server device, a desktop PC, or the like.

(Functional Configuration)

<Image Processing Apparatus>

Figure 6:
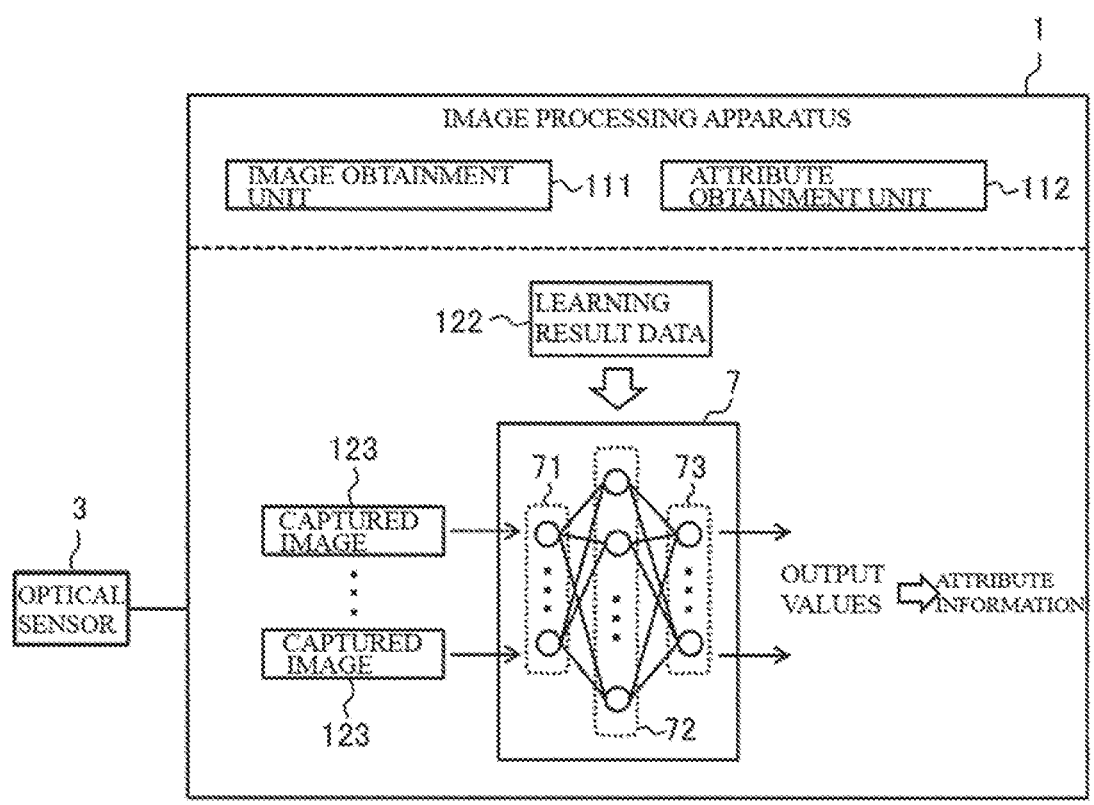
FIG. 6 schematically illustrates an example of the functional configuration of the image processing apparatus according to the embodiment.

An example of the functional configuration of the image processing apparatus 1 according to the present embodiment will be described next using FIG. 6. FIG. 6 schematically illustrates an example of the functional configuration of the image processing apparatus 1 according to the present embodiment.

The control unit 11 of the image processing apparatus 1 loads the image processing program 121 stored in the storage unit 12 into the RAM. The control unit 11 then controls the various constituent elements by using the CPU to analyze and execute the image processing program 121 loaded into the RAM. As a result, as illustrated in FIG. 6, the image processing apparatus 1 according to the present embodiment functions as a computer including an image obtainment unit 111 and an attribute obtainment unit 112.

The image obtainment unit 111 obtains, from each of the image capturing devices 32 in the optical sensor 3 to which the above-described settings have been applied, a captured image 123 formed by the corresponding image capturing device 32. The attribute obtainment unit 112 uses the captured images 123 obtained from the image capturing devices 32 as inputs for the learning device that has learned the attributes of the subject 6, and obtains output values from the learning device by carrying out the computational processing of the learning device. The attribute obtainment unit 112 then obtains the attribute information, indicating the attributes of the subject 6, by specifying the attributes of the subject 6 on the basis of the output values obtained from the learning device.

(Learning Device)

The learning device will be described next. As illustrated in FIG. 6, the image processing apparatus 1 according to the present embodiment uses a neural network 7 as the learning device that has learned the desired attributes of the subject 6. The neural network 7 is a multilayer neural network used in what is known as deep learning, and has an input layer 71, an intermediate layer (hidden layer) 72, and an output layer 73, in order from the input side.

In FIG. 6, the neural network 7 includes one intermediate layer 72, such that the output of the input layer 71 is the input of the intermediate layer 72 and the output of the intermediate layer 72 is the input of the output layer 73. However, the number of intermediate layers 72 is not limited to one, and the neural network 7 may include two or more intermediate layers 72.

Each of the layers 71 to 73 includes one or more neurons. For example, the number of neurons in the input layer 71 can be set in accordance with the number of pixels in the captured images 123, or in other words, the total number of active light-receiving elements in the image capturing devices 32. The number of neurons in the intermediate layer 72 can be set as appropriate in accordance with the embodiment. Additionally, the output layer 73 can be set in accordance with the number of types of attributes of the subject 6 to be analyzed.

The neurons in adjacent layers are connected to each other as appropriate, and a weight is set for each connection (a connection weight). In the example in FIG. 6, each neuron is connected to all of the neurons in the adjacent layers, but the connections of the neurons need not be limited to this example, and may be set as appropriate in accordance with the embodiment.

A threshold is set for each neuron, and the output of each neuron is basically determined on the basis of whether or not a sum of the products of the neurons and their weights exceeds the threshold. The image processing apparatus 1 specifies the attributes of the subject 6 on the basis of the output values obtained from the output layer 73 after inputting the captured images 123 into the input layer 71 of the neural network 7.

Information indicating the configuration of the neural network 7 (for example, the number of layers in the neural network 7, the number of neurons in each layer, the connection relationships between neurons, and transfer functions of the neurons), the weights of the connections between the neurons, and the thresholds for the neurons is included in the learning result data 122. The image processing apparatus 1 refers to the learning result data 122 and sets a trained neural network 7 using a process for analyzing desired attributes of the subject 6.

<Learning Apparatus>

Figure 7:
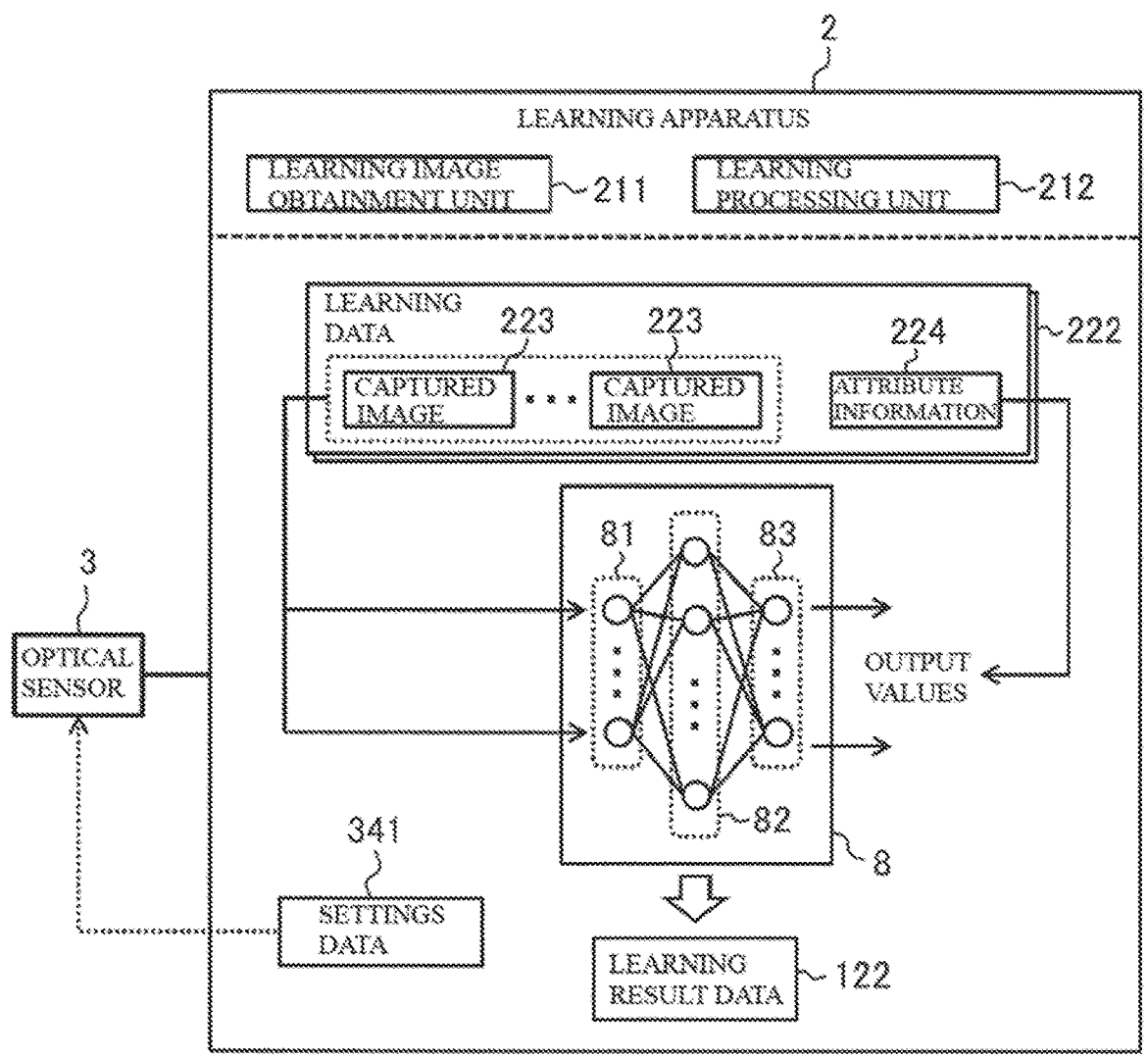
FIG. 7 schematically illustrates an example of the functional configuration of the learning apparatus according to the embodiment.

An example of the functional configuration of the learning apparatus 2 according to the present embodiment will be described next using FIG. 7. FIG. 7 schematically illustrates an example of the functional configuration of the learning apparatus 2 according to the present embodiment.

The control unit 21 of the learning apparatus 2 loads the learning program 221 stored in the storage unit 22 into the RAM. The control unit 21 then controls the various constituent elements by using the CPU to analyze and execute the learning program 221 loaded into the RAM. As a result, as illustrated in FIG. 7, the learning apparatus 2 according to the present embodiment functions as a computer including a learning image obtainment unit 211 and a learning processing unit 212.

The learning image obtainment unit 211 obtains sets of captured images 223 captured by corresponding image capturing devices 32 in the optical sensor 3 and attribute information 224 indicating the attributes of the subject 6 in those captured images 223 as the learning data 222. The learning processing unit 212 uses the learning data 222 to train the neural network 8 to output output values corresponding to the attributes of the subject 6 indicated by the attribute information 224 when the obtained captured images 223 are inputted.

The learning image obtainment unit 211 may create the settings data 341 by selecting the light-receiving elements 321 used in each of the image capturing devices 32 to be suited to the identification of the attributes of the subject 6. In this case, the control unit 33 of the optical sensor 3 may receive the created settings data 341 from the learning apparatus 2 and control the formation of the captured images by the image capturing devices 32 in accordance with the received settings data 341.

As illustrated in FIG. 7, in the present embodiment, the learning device to be trained is the neural network 8. The neural network 8, which is an example of the learning device, includes an input layer 81, an intermediate layer (hidden layer) 82, and an output layer 83, and thus has the same configuration as the neural network 7. The layers 81 to 83 are the same as the layers 71 to 73.

When the learning processing unit 212 executes a learning process on the neural network, and 3×3 images' worth of the captured images 223 obtained by the active light-receiving elements indicated in the settings data 341, the neural network 8, which outputs the output values corresponding to the attributes of the subject 6, is constructed. The learning processing unit 212 then stores the information indicating the configuration of the constructed neural network 8, the weights of the connections between the neurons, and the thresholds for the neurons in the storage unit 22 as the learning result data 122.

<Other>

The various functions of the image processing apparatus 1 and the learning apparatus 2 will be described in detail later in an operation example. The present embodiment describes an example in which all of the functions of the image processing apparatus 1 and the learning apparatus 2 are realized by generic CPUs. However, some or all of the above-described functions may be realized by one or more dedicated processors. With respect to the functional configurations of the image processing apparatus 1 and the learning apparatus 2, functions may be omitted, replaced, or added as appropriate in accordance with the embodiment.

§ 3 Operation Example (Image Processing Apparatus)

Next, an example of the operations of the image processing apparatus 1 will be described using FIG. 8. FIG. 8 is a flowchart illustrating an example of a processing sequence carried out by the image processing apparatus 1. Note that the processing sequence described hereinafter is merely an example, and the processes may be changed as possible. Furthermore, in the processing sequence described hereinafter, steps may be omitted, replaced, or added as appropriate in accordance with the embodiment.

(Startup)

First, a user starts up the image processing apparatus 1 and causes the started-up image processing apparatus 1 to execute the image processing program 121. Referring to the learning result data 122, the control unit 11 of the image processing apparatus 1 constructs the neural network 7, weights the connections between the neurons, and sets the thresholds for the neurons. The control unit 11 then analyzes the attributes of the subject 6 according to the following processing sequence.

(Step S101)

In step S101, functioning as the image obtainment unit 111, the control unit 11 obtains the captured images 123 captured by the image capturing devices 32 from the optical sensor 3 connected through the external interface 16. In the present embodiment, the optical sensor 3 includes 3×3 image capturing devices 32. Then, on the basis of the settings data 341, the light-receiving elements 321 to be used are set for each of the image capturing devices 32 as illustrated in FIGS. 4A to 4I. Thus in step S101, each time image capturing is carried out, the control unit 11 basically obtains 3×3 captured images 123 obtained by the active light-receiving elements indicated by the settings data 341.

(Step S102)

Next, in step S102, functioning as the attribute obtainment unit 112, the control unit 11 obtains output values from the neural network 7 by carrying out the computational processing of the neural network 7 using the captured images 123 obtained in step S101 as the input of the neural network 7.

For example, the control unit 11 inputs the pixel values of each of the pixels in the obtained 3×3 captured images 123 (in other words, the pixels corresponding to the active light-receiving elements in the image capturing devices 32) into the neurons included in the input layer 71 of the neural network 7. The correspondence relationships between the pixels and the neurons may be set as appropriate in accordance with the embodiment. Next, the control unit 11 determines whether each of the neurons in the layers 71 to 73 is firing, along the downstream direction. The control unit 11 can thus obtain the output values from the neurons in the output layer 73 of the neural network 7.

(Step S103)

Next, in step S103, functioning as the attribute obtainment unit 112, the control unit 11 obtains the attribute information indicating the attributes of the subject 6 by specifying the attributes of the subject 6 on the basis of the output values obtained from the neural network 7 in step S102.

As described above, the neural network 7 has been trained so that when the captured images 123 obtained from the image capturing devices 32 to which the settings data 341 has been applied are inputted, output values corresponding to the desired attributes of the desired type of subject 6 are outputted. A number of output value equivalent to the number of neurons in the output layer 73 can be obtained from the neural network 7, and one or more of the obtained output values can be associated with a single attribute (attribute value) of the subject 6. Information indicating the correspondence relationships between the attributes (attribute values) of the subject 6 and the output values of the neural network 7 can be provided as data in table format, for example.

Accordingly, by referring to the information indicating the correspondence relationships between the attributes (attribute values) of the subject 6 and the output values of the neural network 7, the control unit 11 specifies the attributes (attribute values) of the subject 6 on the basis of the output values obtained in step S102. The number of attributes of the subject 6 that are specified may be selected as appropriate in accordance with the embodiment. As a result, the control unit 11 can obtain the attribute information indicating the attributes of the subject 6. After the obtained attribute information has been outputted by the output device 15, for example, the control unit 11 ends the process of analyzing the subject 6 according to this operation example.

As long as the specified attributes of the subject 6 are characteristics of the subject 6 that can appear in the captured images 123 reflecting the settings data 341, the attributes need not be particularly limited, and may be selected as appropriate in accordance with the embodiment. As the attribute information, the control unit 11 may obtain one or a combination of the position, orientation, attitude, size, shape, motion, type, individual identification information, color, brightness, and environment information of the subject 6, for example. The individual identification information is information for identifying same or different types of subjects (objects, items), and may be a serial number, an identifier, or the like, for example. The environment information is information indicating the subject and conditions in the periphery thereof, and may include information such as the brightness in the periphery of the subject, background colors, and information indicating distributions thereof, as well as weather information if the subject to be analyzed is outside.

For example, as described above, the settings illustrated in FIG. 4A are suited to identifying the type and so on of a subject 6 present in front of the optical sensor 3. Thus if the settings illustrated in FIG. 4A are applied to all of the image capturing devices 32, the neural network 7 may be constructed so that if the captured images obtained by the image capturing devices 32 are inputted, the type of the subject 6 present in front of the optical sensor 3 is outputted. In this case, in step S103, the control unit 11 can obtain information indicating the type of the subject 6 present in front of the optical sensor 3 as the attribute information, on the basis of the output values of the neural network 7.

(Learning Apparatus)

Figure 9:
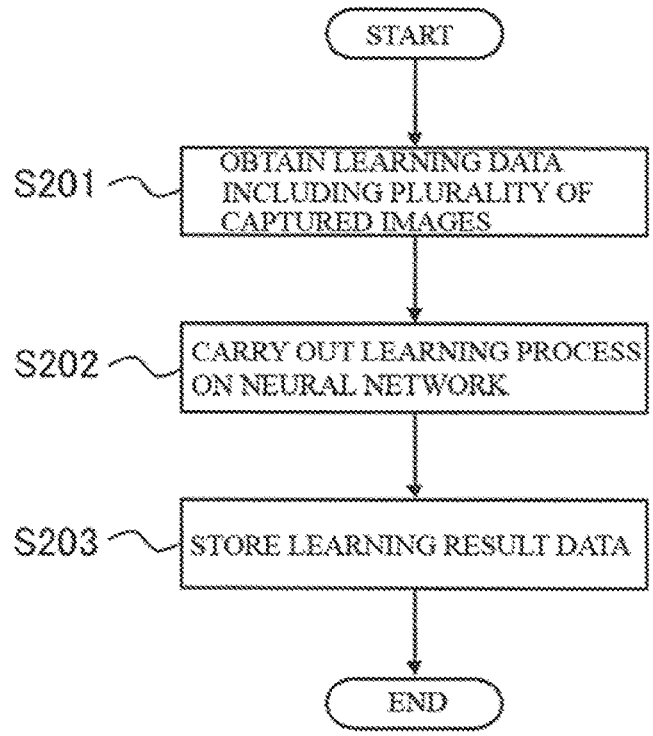
FIG. 9 illustrates an example of a processing sequence carried out by the learning apparatus according to the embodiment.

Next, an example of the operations of the learning apparatus 2 will be described using FIG. 9. FIG. 9 is a flowchart illustrating an example of a processing sequence carried out by the learning apparatus 2. Note that the processing sequence described hereinafter is merely an example, and the processes may be changed as possible. Furthermore, in the processing sequence described hereinafter, steps may be omitted, replaced, or added as appropriate in accordance with the embodiment.

(Step S201)

In step S201, functioning as the learning image obtainment unit 211, the control unit 21 obtains sets of the captured images 223 obtained by corresponding image capturing devices 32 in the optical sensor 3 to which the settings data 341 has been applied and the attribute information 224 indicating the attributes of the subject 6 in the captured images 223 as the learning data 222.

The learning data 222 is data for training the neural network 8 to be capable of analyzing the desired attributes of the subject 6. The learning data 222 can be created by, for example, using the optical sensor 3 to capture images of a prepared subject 6 under various conditions and then associating the captured images that have been obtained with the image capturing conditions.

Specifically, the control unit 21 uses the optical sensor 3 to capture an image of the subject 6 in a state in which each attribute to be analyzed is evident. Through this, the control unit 21 can obtain, from the image capturing devices 32 of the optical sensor 3, a plurality of captured images 223 showing the subject 6 in which the attributes to be analyzed are evident. The optical sensor 3 includes 3×3 image capturing devices 32 in the present embodiment, and thus the control unit 21 can obtain 3×3 captured images 223 each time image capturing is carried out.

The control unit 21 can then create the learning data 222 by accepting the input of the attribute information 224 indicating the attributes of the subject 6 evident in each of the captured images 223 (that is, training data) as appropriate and associating the attribute information 224 provided from the input with each of the captured images 223. The learning data 222 may be created manually by an operator or the like using the input device 24, or may be created automatically by a robot or the like.

Note that the learning data 222 may be created using the learning apparatus 2 as described above, or may be created by another information processing apparatus aside from the learning apparatus 2. When the learning apparatus 2 creates the learning data 222, the control unit 21 obtains the learning data 222 in step S201 by executing a process for creating the learning data 222. However, when another information processing apparatus aside from the learning apparatus 2 creates the learning data 222, the control unit 21 obtains the learning data 222 in step S201 by accessing the other information processing apparatus through a network, the storage medium 92, or the like.

The settings data 341 applied to the image capturing devices 32 of the optical sensor 3 may be unique to the optical sensor 3, or may be created by the learning apparatus 2. When using settings data 341 created by the learning apparatus 2, the settings of the light-receiving elements used to form the captured images, applied to the image capturing devices 32 when creating the learning data 222 (that is, the details of the settings data 341), may be set as appropriate to be suited to the attributes to be analyzed.

For example, in an early stage of the creation of the learning data 222, the control unit 21 may output a pattern of the active light-receiving elements, illustrated in FIGS. 4A to 4I, to a display (the output device 25). The control unit 21 may then accept a selection of a pattern suited to the attributes to be analyzed from the operator or the like through the input device 24. The control unit 21 can therefore determine settings of the light-receiving elements used to form the captured images, applied to the image capturing devices 32 when creating the learning data 222, that are suited to the attributes to be analyzed. In other words, the control unit 21 can create settings data 341 suited to the analysis of designated attributes.

Additionally, the control unit 21 may use a machine learning method such as reinforcement learning to automatically select the light-receiving elements 321 to be used in each of the image capturing devices 32 so as to be suited to the attributes of the subject 6 to be analyzed. At this time, during the process of learning the selections of light-receiving elements suited to the attributes to be analyzed, the control unit 21 may obtain the captured images used in the training from the image capturing devices 32 each time different settings are applied. Alternatively, the control unit 21 may obtain the captured images used in the training by receiving signals from all of the light-receiving elements 321 and forming a captured image (25 pixels), and then omitting the pixels corresponding to the inactive light-receiving elements from the captured image that has been formed.

The control unit 33 of the optical sensor 3 receives the created settings data 341 from the learning apparatus 2 and saves the received settings data 341 in the storage unit 34. Then, when creating the learning data 222 and analyzing the attributes of the subject 6, the control unit 33 reads out the settings data 341 saved in the storage unit 34 and controls the formation of the captured images by the image capturing devices 32 in accordance with the rear-out settings data 341.

(Step S202)

Next, in step S202, functioning as the learning processing unit 212, the control unit 21 uses the learning data 222 obtained in step S201 to train the neural network 8 to output output values corresponding to the attributes of the subject 6 indicated by the attribute information 224 when the captured images 223 are inputted.

Specifically, first, the control unit 21 prepares the neural network 8 to be subjected to the learning process. The configuration of the prepared neural network 8, the default values of the weights on the connections between the neurons, and the default values of the thresholds for the neurons may be provided by a template, or may be provided by inputs made by an operator. If retraining is carried out, the control unit 21 may prepare the neural network 8 on the basis of the learning result data 122 subject to the retraining.

Next, the control unit 21 trains the neural network 8 using the captured images 223 in the learning data 222 obtained in step S201 as input data and the attribute information 224 as the training data. Gradient descent, probabilistic gradient descent, or the like may be used in the training of the neural network 8.

For example, the control unit 21 carries out computation processing in the downstream direction of the neural network 8 using the pixel values in each of the captured images 223 as the inputs to the input layer 81. As a result, the control unit 21 obtains output values outputted from the output layer 83 of the neural network 8. The control unit 21 then calculates error between the output values outputted from the output layer 83 and desired values corresponding to the attributes indicated by the attribute information 224. Next, through differential reverse propagation, the control unit 21 calculates error in the weights of the connections between the neurons and in the thresholds for the neurons using the calculated error in the output values. Then, on the basis of the calculated errors, the control unit 21 updates the values of the weights of the connections between the neurons and the thresholds for the neurons.

The control unit 21 trains the neural network 8 by repeating this series of processes for each instance of the learning data 222 until the output values outputted from the neural network 8 match the desired values corresponding to the attributes indicated by the attribute information 224. As a result, the neural network 8 that outputs output values corresponding to the attributes indicated by the attribute information 224 when the captured images 223 are inputted can be constructed.

(Step S203)

Next, in step S203, functioning as the learning processing unit 212, the control unit 21 stores the information indicating the configuration of the constructed neural network 8, the weights of the connections between the neurons, and the thresholds for the neurons in the storage unit 22 as the learning result data 122. If the settings data 341 has been created during the creation of the learning data 222, the control unit 21 stores the created settings data 341 in the storage unit 22 in association with the learning result data 122. Through this, the control unit 21 ends the process of training the neural network 8 according to this operation example.

Note that the control unit 21 may transfer the created learning result data 122 to the image processing apparatus 1 after the process of step S203 is complete. The control unit 21 may also periodically update the learning result data 122 by periodically executing the learning process of steps S201 to S203. The control unit 21 may periodically update the learning result data 122 held in the image processing apparatus 1 by transferring the created learning result data 122 to the image processing apparatus 1 each time the learning process is executed.

Additionally, if the settings data 341 has been created during the creation of the learning data 222, the control unit 21 may transfer the created settings data 341 to the optical sensor 3 connected to the image processing apparatus 1 directly, or may transfer the data to the optical sensor 3 via the image processing apparatus 1. When the settings data 341 is transferred to the optical sensor 3 via the image processing apparatus 1, the control unit 11 of the image processing apparatus 1 may transfer the settings data 341 received from the learning apparatus 2 to the optical sensor 3 as an initial operation in executing the analysis of the attributes of the subject 6.

(Effects)

According to the present embodiment as described above, in step S101, the settings data 341 indicating the settings of the light-receiving elements used to form the captured images is applied to the image capturing devices 32 of the optical sensor 3. Accordingly, captured images 123 from which unused and thus needless information has been omitted can be obtained from the image capturing devices 32. Additionally, in steps S102 and S103, a plurality of such captured images 123 are inputted into the neural network 7, and the attributes of the subject 6 are specified on the basis of the output values obtained from the neural network 7. In the training part too, the neural network 8 can be trained using a plurality of captured images 223 from which needless information has been omitted.

In other words, according to the present embodiment, the attributes of the subject 6 can be identified while reducing the amount of calculations in the identification process by using the pluralities of captured images (123, 223) from which needless information has been omitted as the inputs of the neural networks (7, 8). Thus according to the present embodiment, an identification process suited to the attributes of the subject 6 can be carried out.

A neural network having a complex configuration, such as a convolutional neural network, is typically used when identifying the attributes of a subject from a captured image. However, in the present embodiment, information can be omitted from the captured images (123, 223), and thus the attributes of the subject 6 can be identified from the captured images (123, 223) even with a neural network having a simple configuration. This makes it possible to apply the present invention even in systems having comparatively low machine power, such as controllers in automobiles.

Additionally, according to the present embodiment, the optical sensor 3 controls the settings of the light-receiving elements used to form the captured images on the basis of the settings data 341 using software. Thus the settings of the light-receiving elements used to form the captured images can be changed easily each time the training target is changed, the attributes to be analyzed are changed, and so on. Accordingly, the image processing system 100 and the learning apparatus 2 according to the present embodiment can handle a variety of types of the subject 6 and the attributes thereof.

§ 4 Variations

Although an embodiment of the present invention has been described in detail thus far, the foregoing descriptions are intended to be nothing more than an example of the present invention in all senses. It goes without saying that many improvements and changes can be made without departing from the scope of the present invention. For example, variations such as those described below are also possible. In the following, constituent elements that are the same as those in the above-described embodiment will be given the same reference signs, and points that are the same as in the above-described embodiment will not be described. The following variations can also be combined as appropriate.

<4.1>

In the embodiment described above, typical feed-forward neural networks having multilayer structures are used as the neural networks (7, 8), as illustrated in FIGS. 6 and 7. However, the types of the neural networks (7, 8) need not be limited to this example, and may be selected as appropriate in accordance with the embodiment. For example, the neural networks (7, 8) may be convolutional neural networks using the input layer and the intermediate layer as a convolutional layer and a pooling layer. Alternatively, the neural networks (7, 8) may be recursive neural networks having recursive connections from the output side to the input side, such as from the intermediate layer to the input layer. The number of layers in the neural networks (7, 8), the number of neurons in each layer, the connection relationships between neurons, and the transfer functions of the neurons may be set as appropriate in accordance with the embodiment.

<4.2>

In the embodiment described above, the image processing apparatus 1 that analyzes the attributes of the subject 6 and the learning apparatus 2 that trains the learning device (neural network) are constituted by separate computers. However, the configurations of the image processing apparatus 1 and the learning apparatus 2 need not be limited to this example, and a system having the functions of both the image processing apparatus 1 and the learning apparatus 2 may be realized by one or more computers.

<4.3>

In the embodiment described above, the learning device is constituted by a neural network. However, as long as the plurality of captured images 123 obtained from the image capturing devices 32 can be used as inputs, the type of the learning device is not limited to a neural network, and may be selected as appropriate in accordance with the embodiment. Aside from the neural networks described above, a learning device constituted by a support vector machine, a self-organizing map, or a learning device that learns through reinforcement learning can be given as an example of a learning device that can input the plurality of captured images 123.

<4.4>

In the embodiment described above, the lens array 31 includes 3×3 lenses 311, and accordingly, the optical sensor 3 includes 3×3 image capturing devices 32. However, the number of lenses 311 in the lens array 31 and the number of image capturing devices 32 need not be limited to this example, and may be set as appropriate in accordance with the embodiment. Additionally, the lenses 311 and the image capturing devices 32 do not need to correspond one-to-one.

Furthermore, in the embodiment described above, the configuration is such that each image capturing device 32 includes 5×5 light-receiving elements 321, and thus a captured image having 5×5 pixels can be formed. However, the number of pixels in the captured image formed by each image capturing device 32, or in other words, the number of light-receiving elements 321 in the image capturing device 32, need not be limited to this example, and may be selected as appropriate in accordance with the embodiment. Additionally, each image capturing device 32 may have a different number of pixels.

<4.5>

In the embodiment described above, a lens array is used as an example of an optical member having a plurality of focusing units that each focus light from a subject. However, the type of the optical member need not be limited to a lens array, and may be selected as appropriate in accordance with the embodiment. Aside from a lens array, the optical member may include at least one of a diffraction grating, a diffusion lens, and a hologram lens. Additionally, an optical member that transmits light to the image capturing devices in an irregular manner, such as a frosted glass-type plate, may be used instead of a lens-shaped member. If a diffraction grating, a diffusion lens, or a hologram lens is used, a part that allows light to be incident on a single image capturing device serves as a focusing unit. In other words, although a diffraction grating, a diffusion lens, and a hologram lens are typically formed as flat plates, a plurality of focusing units are present in the flat plate-shaped optical member, corresponding to the image capturing devices that receive the light through the optical member. Note that the optical properties, such as the focus angle, refractive index, and band of light allowed to pass, need not be the same for each focusing unit provided corresponding to the image capturing devices.

<4.6>

In the embodiment described above, the image capturing devices 32 are configured as image sensors. However, the configuration of the image capturing devices 32 need not be limited to this example. For example, each image capturing device 32 may be constituted of a typical image capturing apparatus (camera). In this case, the lens of each image capturing apparatus corresponds to a "focusing unit" according to the present invention.

<4.7>

In step S103, the control unit 11 may create an image in which the subject 6 is rendered on the basis of the output of the neural network 7 and output the created image as the attribute information. In this case, a captured image captured by a typical camera that does not include a lens array can be used in the attribute information 224 (the training data) during training. In other words, in step S201, a typical camera is arranged in almost the same position as the optical sensor 3. When the optical sensor 3 captures images of the subject 6, the camera also captures an image of the subject 6. As a result, the learning data 222 can be created by taking the captured image obtained by the camera as the attribute information 224 and associating that information with the plurality of captured images 223 obtained by the optical sensor 3. In the image rendered on the basis of the output of the neural network 7, some of the characteristics of the subject 6 may be missing from the image of the subject 6. For example, if the subject 6 is a human, an image of the human with facial details missing can be obtained. This makes it possible to provide output that takes privacy issues into consideration.

<4.8>

In the embodiment described above, the optical sensor 3 controls the settings of the light-receiving elements used to form the captured images on the basis of the settings data 341 using software. However, the method for controlling the settings of the light-receiving elements used to form the captured images need not be limited to this example. For example, the settings of the light-receiving elements used to form the captured images may be controlled by hardware.

Figure 10:
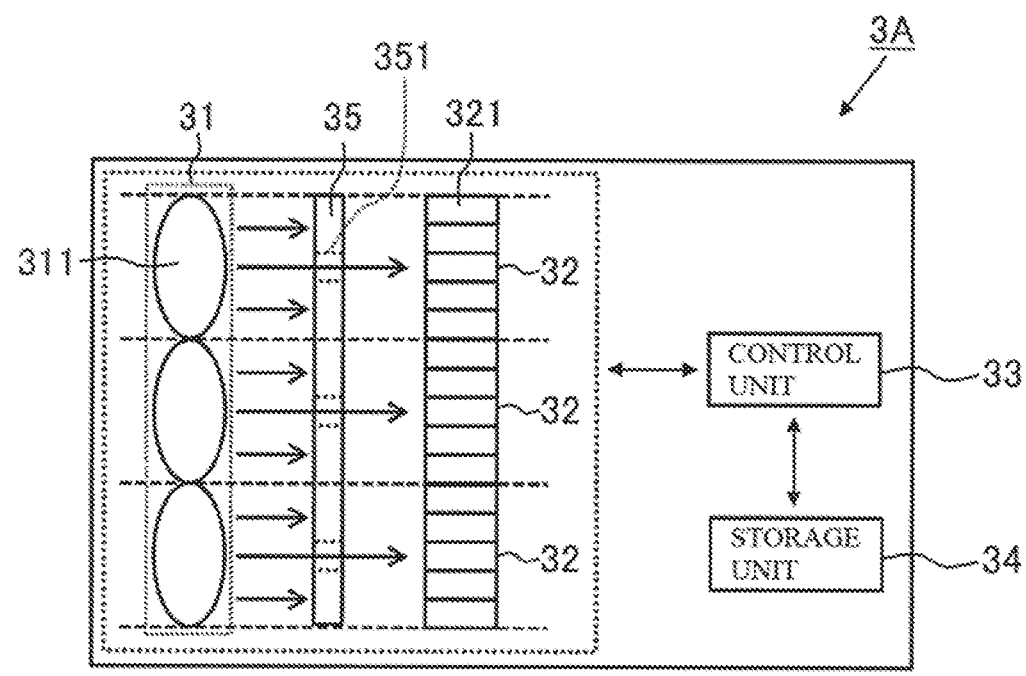
FIG. 10 schematically illustrates an example of the configuration of an optical sensor according to a variation.

FIG. 10 schematically illustrates an example of the configuration of an optical sensor 3A according to the present variation. Aside from a shielding member 35 arranged between the lens array 31 and the image capturing devices 32, the optical sensor 3A has the same configuration as the optical sensor 3 according to the embodiment described above. The shielding member 35 is formed from a plate-shaped material capable of blocking light, for example, and includes through-holes 351 in positions corresponding to the active light-receiving elements such that light from the subject 6 can reach the active light-receiving elements. Accordingly, the shielding member 35 is configured to block light from the light-receiving elements 321 not used to form the captured images without blocking light from the light-receiving elements 321 used to form the captured images. The settings for the light-receiving elements used to form the captured images may thus be carried out by using the shielding member 35 to control the range that light from the subject 6 can reach. Accordingly, selecting the light-receiving elements to be used in accordance with the learning application makes it possible to carry out an identification process suited to the attributes of the subject. Crosstalk between adjacent light-receiving elements (that is, electrons moving between adjacent light-receiving elements) can be reduced as well. In other words, because the shielding member 35 is present, photons do not enter the inactive light-receiving elements. This makes it possible to prevent the resolution from being negatively affected by electrons generated in the light-receiving elements dispersing to adjacent light-receiving elements.

<4.9>

The optical sensor 3 according to the embodiment described above does not include any lenses aside from the lens array 31. However, the configuration of the optical sensor 3 need not be limited to this example, and the optical sensor 3 may include a plurality of lenses.

Figure 11:
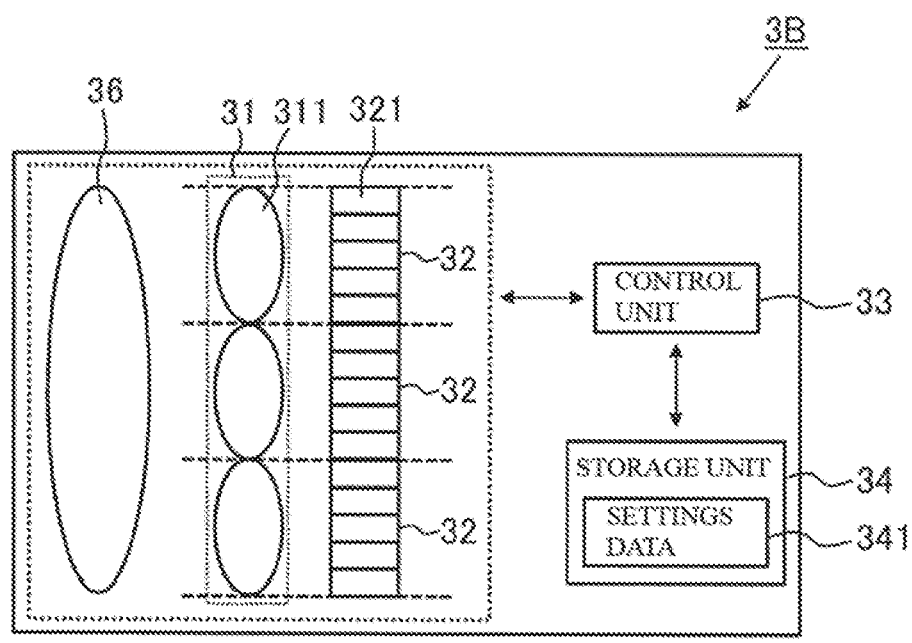
FIG. 11 schematically illustrates an example of the configuration of an optical sensor according to a variation.

FIG. 11 schematically illustrates an example of the configuration of an optical sensor 3B according to the present variation. Aside from including a focusing lens 36, the optical sensor 3B has the same configuration as the optical sensor 3 according to the embodiment described above. The focusing lens 36 is arranged closer to the subject 6 than the lens array 31, and focuses light from the subject 6. Note that the focusing lens 36 may be configured so that the optical axis direction of incident light can be varied appropriately using a motor (not illustrated) or the like. This makes it possible to enlarge or reduce the image capturing range.

<4.10>

In the embodiment described above, the settings data 341 is held in the optical sensor 3. However, the storage location of the settings data 341 need not be limited to this example. For example, the settings data 341 may be stored in the image processing apparatus 1, network-attached storage (NAS), or the like.

Figure 12:
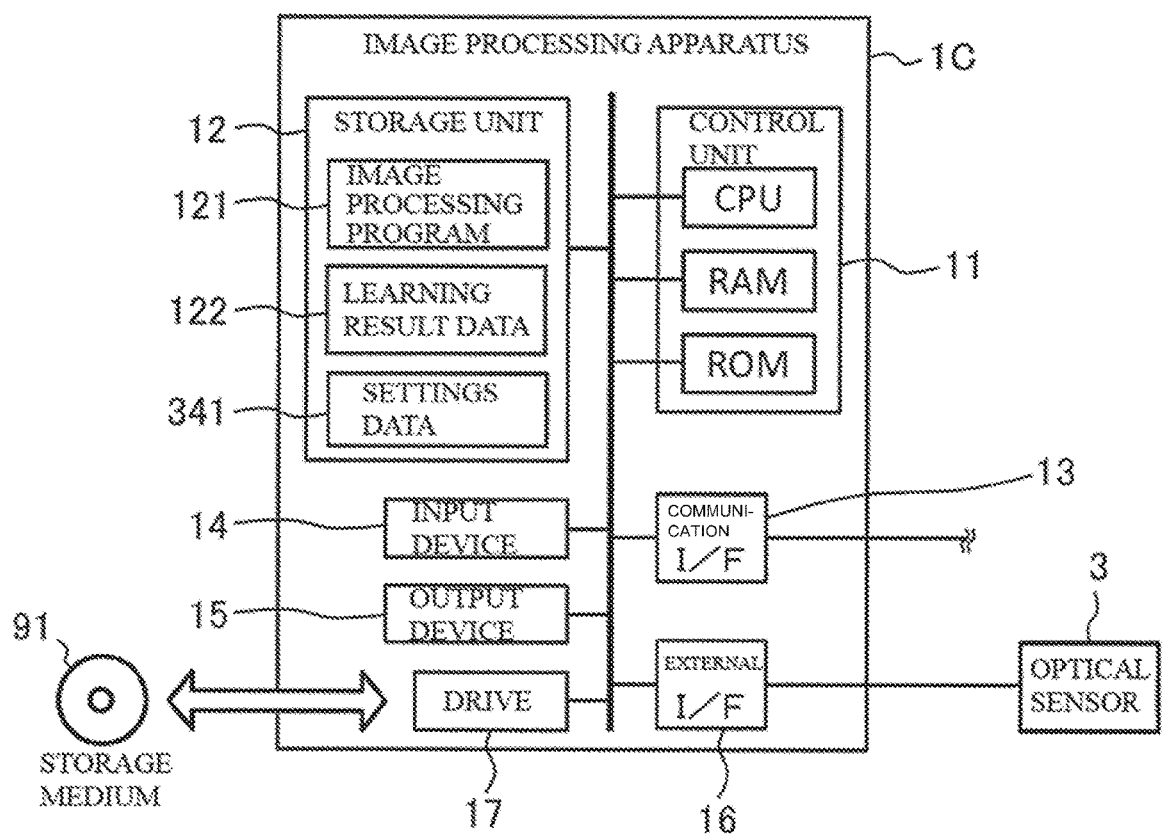
FIG. 12 schematically illustrates an example of the configuration of an image processing apparatus according to a variation.

FIG. 12 schematically illustrates an example of the configuration of an image processing apparatus 1C according to the present variation. Aside from storing the settings data 341 in the storage unit 12, the image processing apparatus 1C has the same configuration as the image processing apparatus 1 according to the embodiment described above. For example, the image processing apparatus 1C obtains the learning result data 122, as well as the settings data 341 associated with that learning result data 122, from the learning apparatus 2.

In this case, for example, the control unit 11 may control the optical sensor 3 connected via the external interface 16 on the basis of the settings data 341 so that captured images are formed by the active light-receiving elements. Additionally, for example, the control unit 11 may form captured images constituted of 5×5 pixels by accepting signals from all of the light-receiving elements 321 in the image capturing devices 32. Then, in accordance with the settings data 341, the control unit 11 may select the pixels to be inputted to the neural network 7 from the 5×5 pixels constituting the captured images obtained by the image capturing devices 32. The captured images 123 in which the settings for the light-receiving elements used to form the captured images are applied are obtained as a result of this selection. According to this configuration, the settings of the light-receiving elements used to form the captured images can be controlled by hardware, in the same manner as in the embodiment described above.

<4.11>

The above-described image processing apparatus 1 has a single learning device (neural network) by holding a single instance of the learning result data 122. However, the number of instances of the learning result data 122 held by the image processing apparatus 1 need not be limited to this example, and the image processing apparatus 1 may hold a plurality of instances of the learning result data 122.

Figure 13:
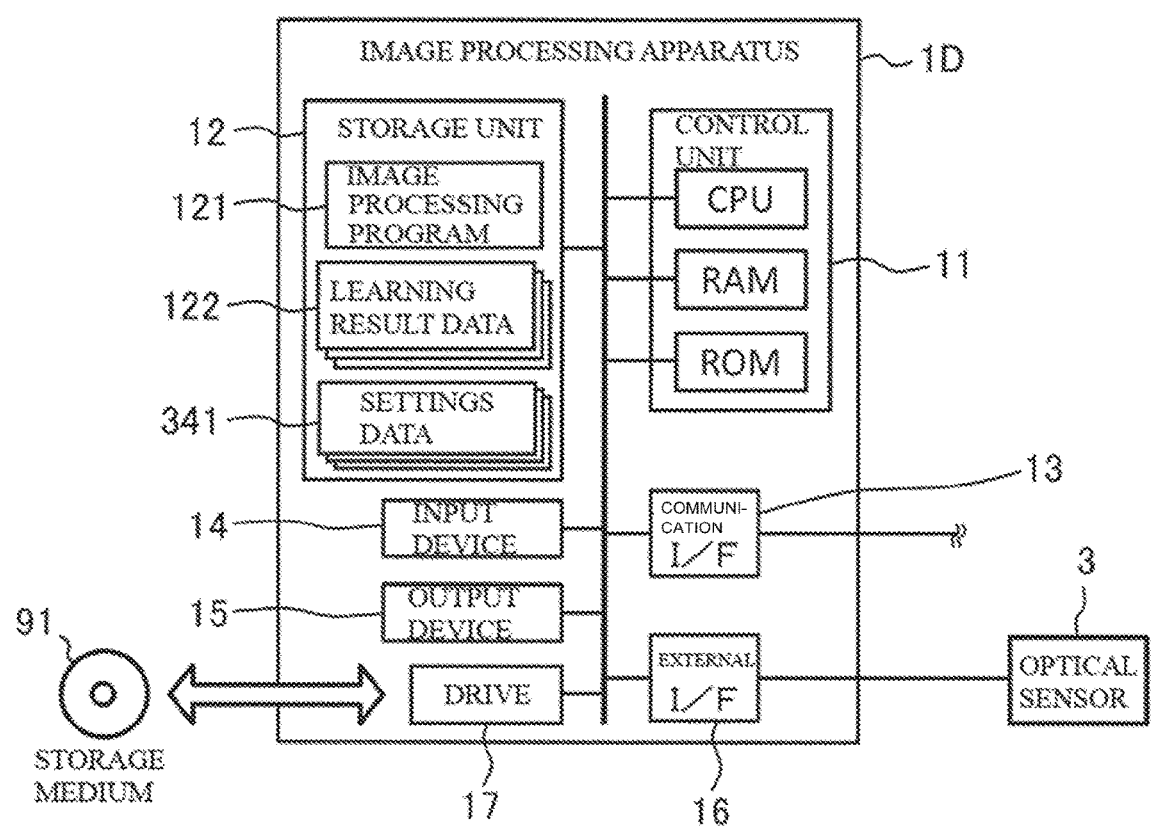
FIG. 13 schematically illustrates an example of the configuration of an image processing apparatus according to a variation.

FIG. 13 schematically illustrates an example of the configuration of an image processing apparatus 1D according to the present variation. Aside from storing a plurality of instances of the learning result data 122 and a plurality of instances of the settings data 341 in the storage unit 12, the image processing apparatus 1D has the same configuration as the image processing apparatus 1 according to the embodiment described above. The image processing apparatus 1D may obtain each instance of the learning result data 122 and each instance of the settings data 341 from the learning apparatus 2 over the network 10, or from the storage medium 91 via the drive 17, in response to the input device 14 being operated by a user. Alternatively, the image processing apparatus 1D may obtain each instance of the learning result data 122 and each instance of the settings data 341 by accepting transmissions from the learning apparatus 2. Furthermore, each instance of the learning result data 122 and each instance of the settings data 341 may be stored in another information processing apparatus (storage device) such as NAS, and the image processing apparatus 1D may obtain each instance of the learning result data 122 and each instance of the settings data 341 by accessing that other information processing apparatus.

In this case, the image processing apparatus 1D can switch the neural network 7 being used in accordance with instructions from the user, the type of the subject 6, the attributes of the subject 6 to be analyzed, and so on. When switching the neural network 7 being used, the image processing apparatus 1D sets the light-receiving elements used to form the captured images on the basis of the settings data 341 associated with the learning result data 122 indicating the neural network 7 to be used.

<4.12>

In the embodiment described above, the optical sensor 3 is configured so that the settings for the light-receiving element used to form the captured images are made for all of the image capturing devices 32. However, the configuration of the optical sensor 3 need not be limited to this example. The optical sensor 3 may include one or more other image capturing devices in which settings for the light-receiving elements used to form the captured images are not made.

Figure 14:
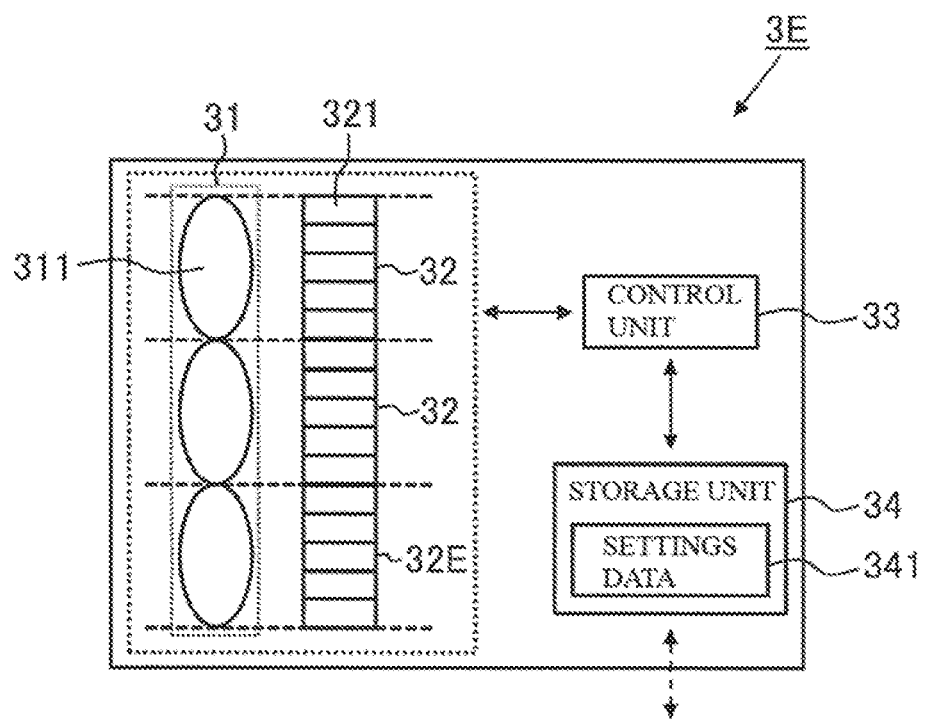
FIG. 14 schematically illustrates an example of the configuration of an optical sensor according to a variation.

FIG. 14 schematically illustrates an example of the configuration of an optical sensor 3E according to the present variation. In the example of FIG. 14, the optical sensor 3E includes a plurality of image capturing devices 32 in which settings for the light-receiving elements to be used are made, and an image capturing device 32E in which settings for the light-receiving elements to be used are not made. For the sake of simplicity, the image capturing devices 32 in which the settings for the light-receiving elements to be used are made will be called "first image capturing devices 32", and the image capturing device 32E in which settings for the light-receiving elements to be used are not made will be called a "second image capturing device 32E".

The second image capturing device 32E, in which settings for the light-receiving elements to be user are not made, forms a captured image using all of the light-receiving elements. Accordingly, settings for the light-receiving elements to be used can be made for some of the plurality of image capturing devices in the optical sensor 3E. The positional relationship between the first image capturing devices 32 and the second image capturing device 32E need not be limited to the example of FIG. 14, and may be set as appropriate in accordance with the embodiment. The number of second image capturing devices 32E may also be selected as appropriate in accordance with the embodiment, and may be one, or two or more. In terms of eliminating needless information, it is preferable that there be two or more of the first image capturing devices 32.

The invention claimed is:

1. An optical sensor comprising:
   an optical member comprising a plurality of focusing units, each focusing unit focusing light from a subject comprising a predetermined object or scene external to the optical sensor; and
   a plurality of image capturing devices, each image capturing device comprising a plurality of light-receiving elements, each image capturing device being provided corresponding to one of the focusing units, and each image capturing device configured to receive light focused by the corresponding focusing unit and form a captured image of the subject comprising attributes of the subject identified by a trained learning device as attributes by which the subject is characterized,
   wherein light-receiving elements, of the plurality of light-receiving elements, that are to be used to form the captured image are set for each of the image capturing devices, and wherein the light-receiving elements used to form the captured images are selected in accordance with the attributes of the subject identified by the trained learning device from the captured images.

2. The optical sensor according to claim 1, further comprising:
   a control unit configured to control the forming of the captured images by the image capturing devices in accordance with settings data indicating settings for the light-receiving elements to be used to form the captured images.

3. The optical sensor according to claim 1, wherein the setting of the light-receiving elements used to form the captured images is carried out by a shielding member configured to block light from light-receiving elements not used to form the captured images without blocking light from the light-receiving elements used to form the captured images.

4. The optical sensor according to claim 1, further comprising a focusing lens arranged closer to the subject than the optical member is, and configured to focus light from the subject.

5. The optical sensor according to claim 1, wherein the optical member comprises at least one of a lens array, a diffraction grating, a diffusion lens, and a hologram lens.

6. A learning apparatus comprising a processor configured with a program to perform operations comprising:
   operation as an image obtainment unit configured to obtain the captured images captured by the image capturing devices from the optical sensor according to claim 1; and
   operation as a learning processing unit configured to train a learning device to output attribute information of the subject upon the obtained captured images being inputted.

7. The optical sensor according to claim 2, further comprising a focusing lens arranged closer to the subject than the optical member is, and configured to focus light from the subject.

8. The optical sensor according to claim 2, wherein the optical member comprises at least one of a lens array, a diffraction grating, a diffusion lens, and a hologram lens.

9. An image processing system comprising:
   an optical sensor comprising an optical member comprising a plurality of focusing units, each focusing unit focusing light from a subject comprising a predetermined object or scene external to the optical sensor, and a plurality of image capturing devices, each image capturing device comprising a plurality of light-receiving elements, each image capturing device being provided corresponding to one of the focusing units, and each image capturing device configured to receive light focused by the corresponding focusing unit and form a captured image of the subject comprising attributes of the subject previously identified by a trained learning device as attributes by which the subject is characterized, and the light-receiving elements, of the plurality of light-receiving elements, that are to be used to form the captured image being set for each of the image capturing devices; and
   an information processing apparatus configured to obtain attribute information indicating attributes of the subject by inputting the captured images obtained by the image capturing devices into the trained learning device that has been trained to identify the attributes of the subject, wherein
   the light-receiving elements used to form the captured images are selected in accordance with the attributes of the subject identified by the trained learning device from the captured images.

10. The image processing system according to claim 9, wherein in accordance with settings data indicating settings for the light-receiving elements used to form the captured images, the information processing apparatus selects pixels to be inputted to the learning device from a plurality of pixels constituting the captured images obtained by the image capturing devices.

11. The image processing system according to claim 9, wherein the learning device comprises a neural network, a support vector machine, a self-organizing map, or a learning device that learns through reinforcement learning.

12. The image processing system according to claim 9, wherein the information processing apparatus outputs, as the attribute information, one or a combination of a position, orientation, attitude, size, shape, motion, type, individual identification information, color, brightness, and environment information of the subject.

13. The image processing system according to claim 9, wherein on the basis of output of the learning device, the information processing apparatus creates an image in which the subject is rendered, and outputs the created image as the attribute information.

14. The image processing system according to claim 10, wherein the learning device comprises a neural network, a support vector machine, a self-organizing map, or a learning device that learns through reinforcement learning.

15. The image processing system according to claim 10, wherein the information processing apparatus outputs, as the attribute information, one or a combination of a position, orientation, attitude, size, shape, motion, type, individual identification information, color, brightness, and environment information of the subject.

16. The image processing system according to claim 10, wherein on the basis of output of the learning device, the information processing apparatus creates an image in which the subject is rendered, and outputs the created image as the attribute information.

17. An image processing system comprising:
   an optical sensor comprising an optical member comprising a plurality of focusing units, each focusing unit focusing light from a subject, and a plurality of image capturing devices, each image capturing device comprising a plurality of light-receiving elements, each image capturing device being provided corresponding to one of the focusing units, and each image capturing device configured to receive light focused by the corresponding focusing unit and form a captured image of the subject, and the light-receiving elements, of the plurality of light-receiving elements, that are to be used to form the captured image being set for each of the image capturing devices; and
   an information processing apparatus configured to obtain attribute information indicating attributes of the subject by inputting the captured images obtained by the image capturing devices into a trained learning device that has been trained to identify attributes of the subject, wherein
   the light-receiving elements used to form the captured images are selected in accordance with attributes of the subject to be identified from the captured images, and
   the learning device comprises a neural network, a support vector machine, a self-organizing map, or a learning device that learns through reinforcement learning.

* * * * *